Jan. 8, 1963   S. L. KOUTZ ET AL   3,072,549
NEUTRONIC REACTOR
Filed June 25, 1958   9 Sheets-Sheet 1

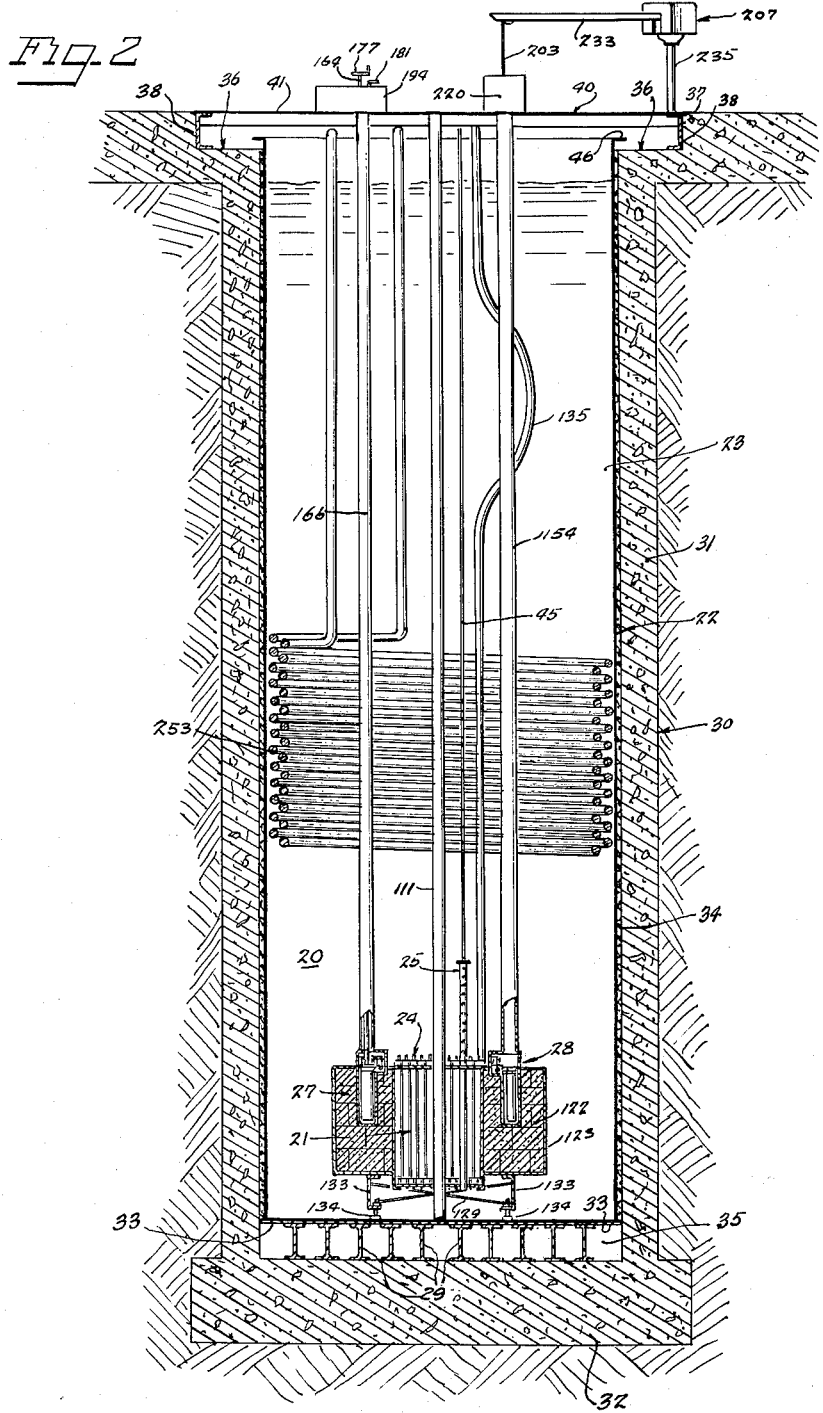

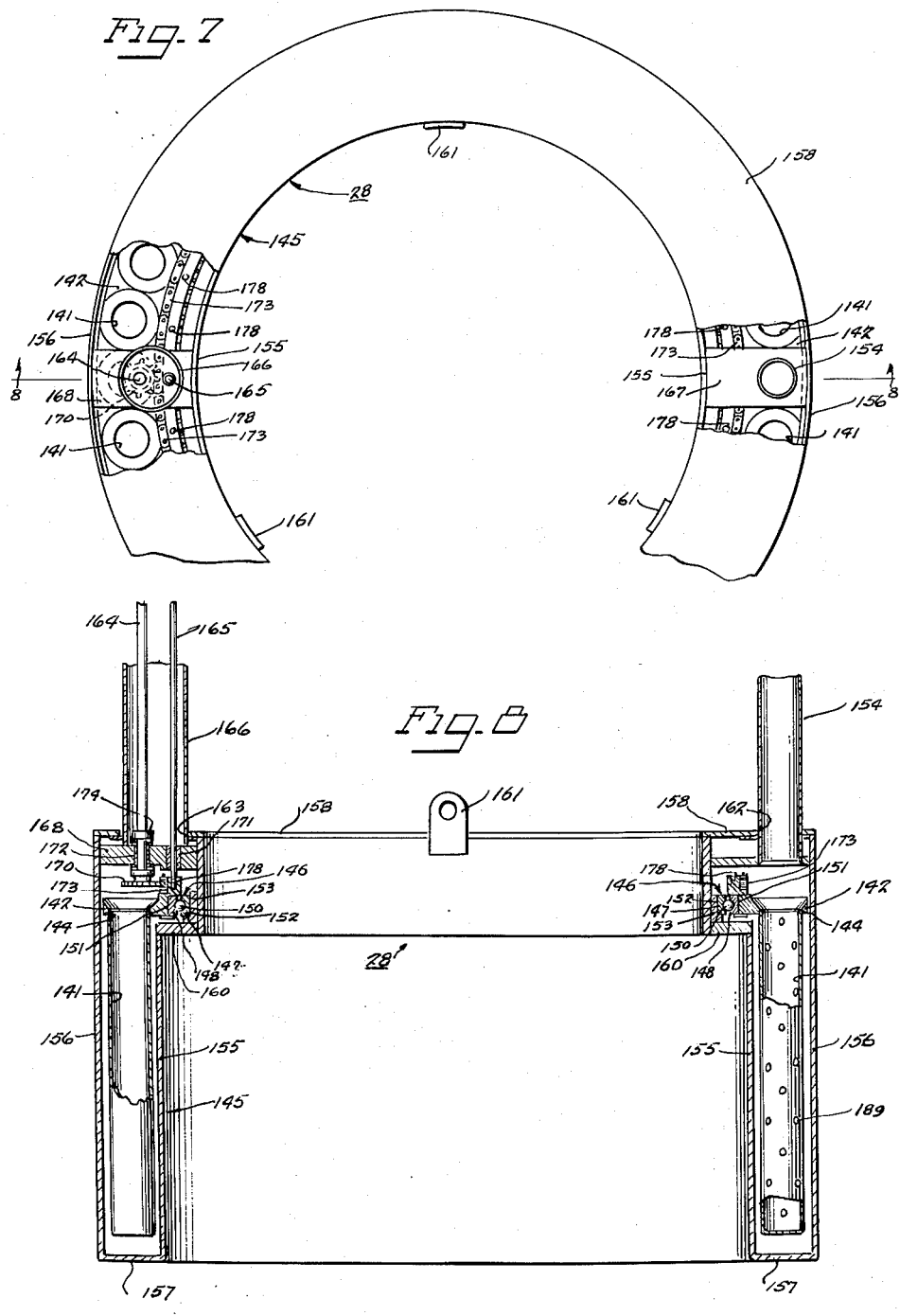

Jan. 8, 1963  S. L. KOUTZ ET AL  3,072,549
NEUTRONIC REACTOR
Filed June 25, 1958  9 Sheets-Sheet 5
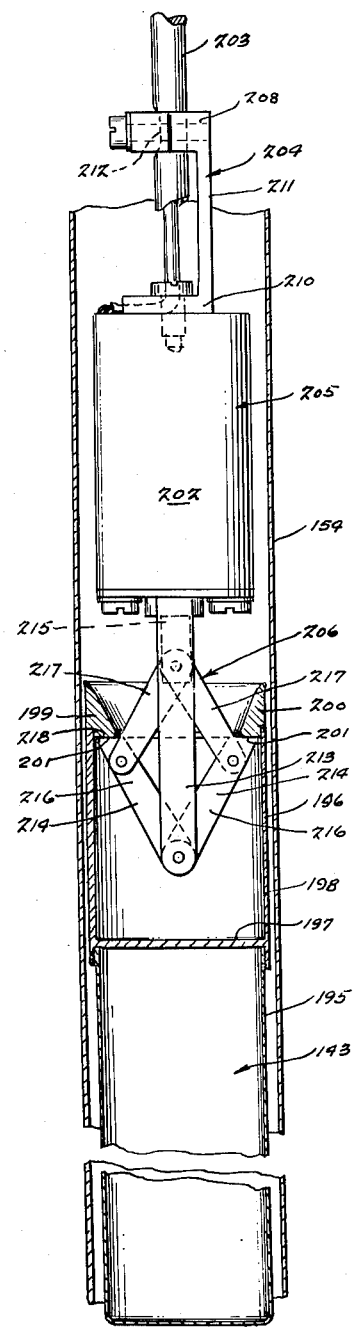
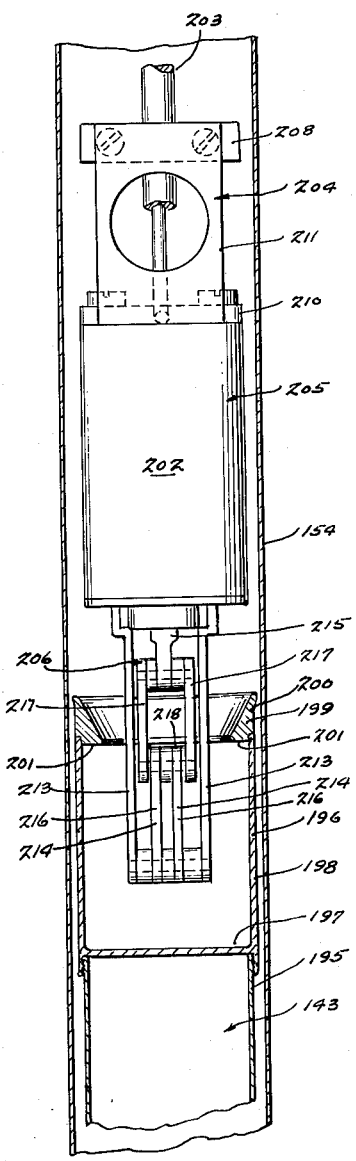

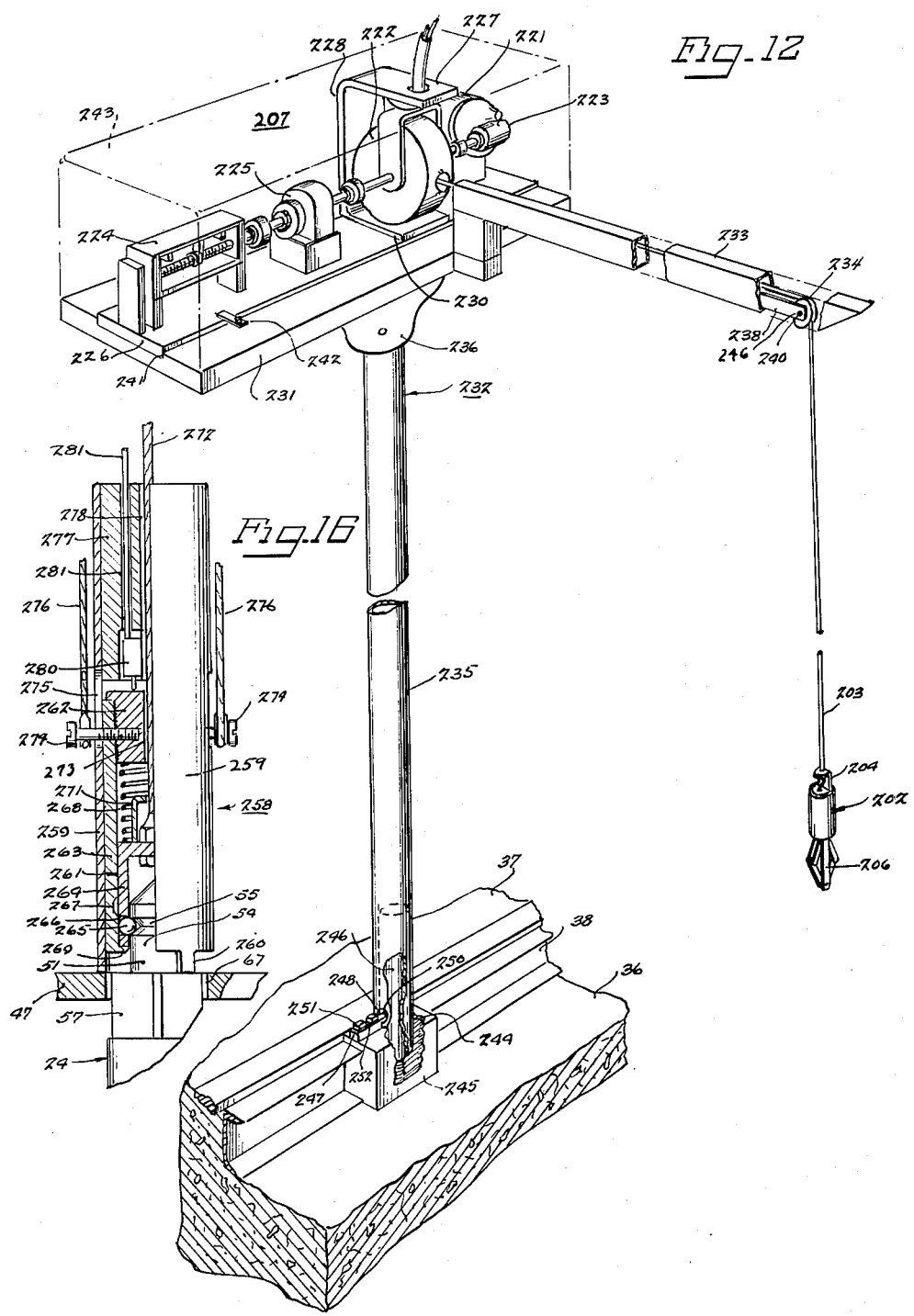

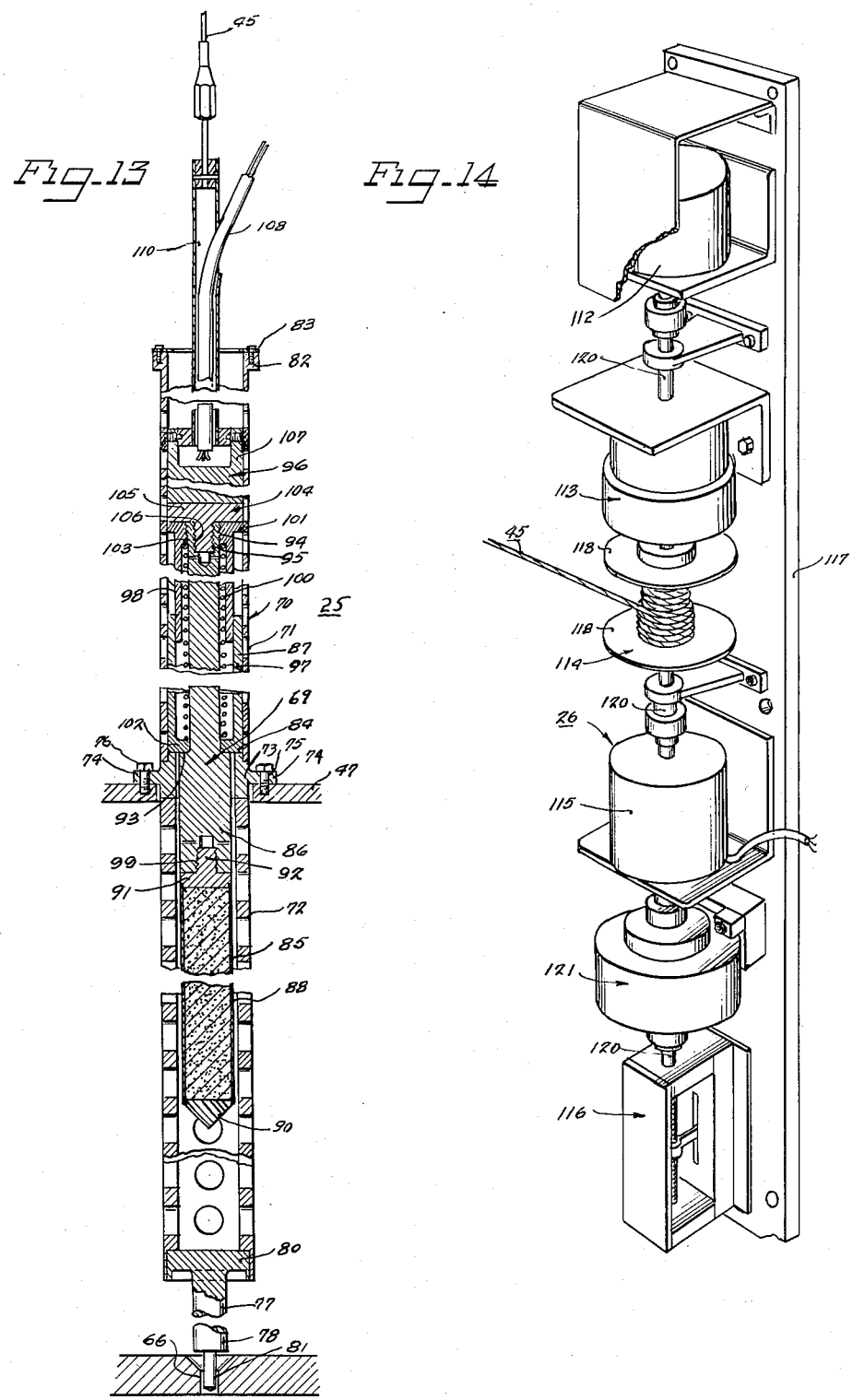

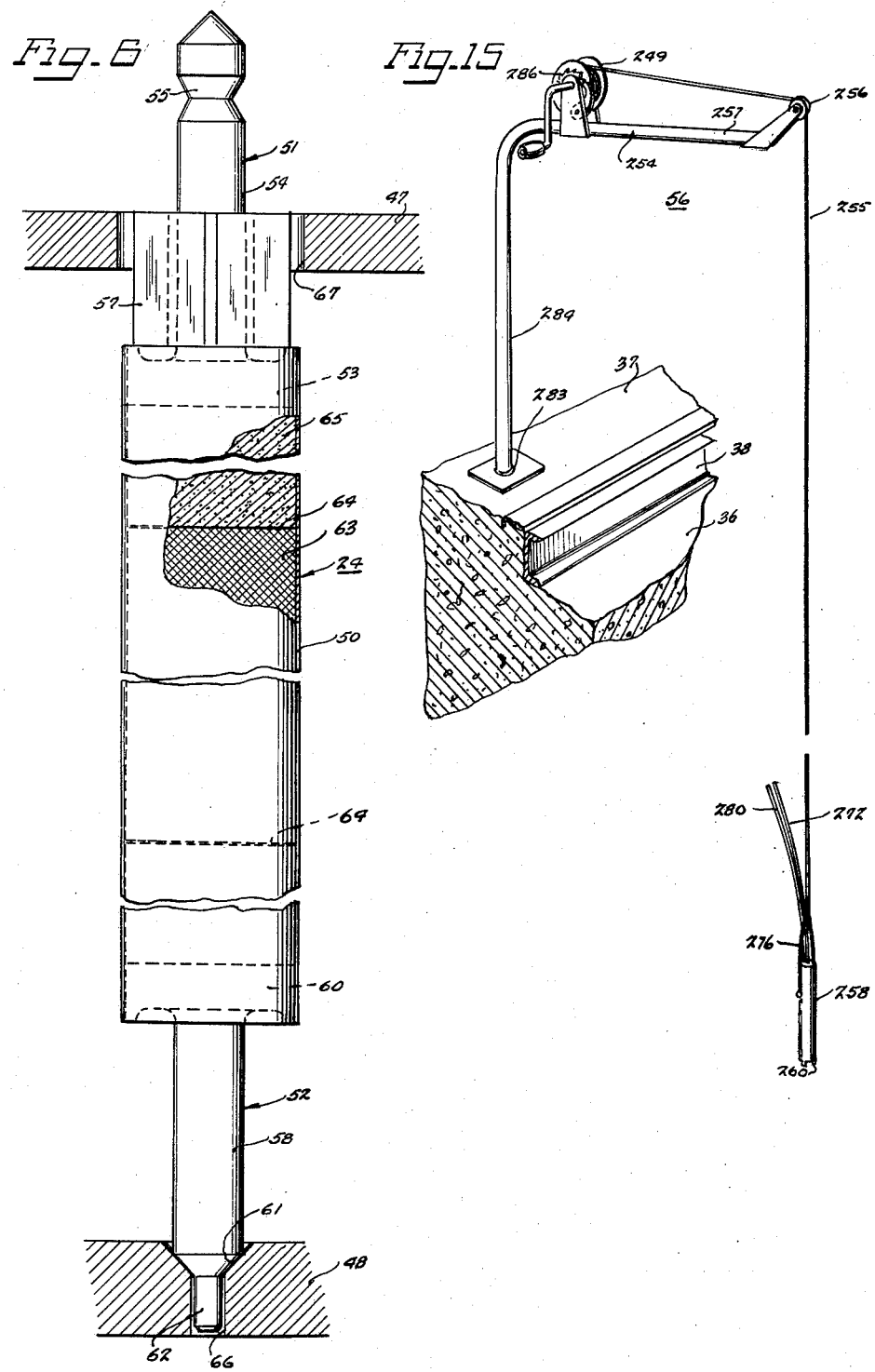

> United States Patent Office 3,072,549
Patented Jan. 8, 1963

3,072,549
NEUTRONIC REACTOR
Stanley L. Koutz, Pacific Beach, Robert B. Duffield, La Jolla, Robert B. Minogue, Solana Beach, William A. Compton, Pacific Beach, and Harriett R. Lynch, El Cajon, Calif., assignors to General Dynamics Corporation, New York, N.Y., a corporation of Delaware
Filed June 25, 1958, Ser. No. 744,364
11 Claims. (Cl. 204—193.2)

The present invention relates generally to neutronic reactors and more particularly to a neutronic reactor which is especially useful for producing radioactive isotopes.

Radioactive isotopes are being used in increasing quantities in reserach, industry and medicine. Radioactive isotopes of half lives longer than 12 hours are mainly being supplied by the Atomic Energy Commission. Unfortunately, radioactive isotopes having half lives of less than 12 hours generally cannot be shipped from Atomic Energy Commission production plants to a utilizing organization in time for practical use. There are roughly about 60 short-lived isotopes which can be easily produced by an isotope-producing reactor facility which are, in effect, unavailable for commercial use. Such short-lived radioactive isotopes have certain inherent advantages, particularly in tracer techniques, over longer-lived isotopes. In this connection, in medical and biological uses of radioactive tracers, it is desirable to hold to a minimum the radiation dose administered to the system in which the tracer is used. It can be shown that, for a given activity at the time the radioactive measurement is made, the smallest dosage is incurred by the system when the mean life of the radioactive tracer is equal to the time interval between the injection of the radioactive isotope and its measurement. Also, it is possible to use radioactive isotopes for certain production control applications only if the residual activity a short time after production is sufficiently low. Certain short-lived radioactive isotopes can be produced with very little longer-lived contamination so that decay to a negligible background takes place within a day or two. A further advantage is that short-lived radioactive wastes are far easier to dispose of than longer-lived radioactive wastes.

Accordingly, it would be desirable to have available short-lived radioactive isotopes for commercial uses. This may be accomplished by producing the particular radioactive isotopes in an isotope-producing facility such as a neutronic reactor on the premises of the utilizing organization.

Additional advantages arise from having a neutronic reactor on the premises which is capable of producing radioactive isotopes. In this connection, regardless of the length of the half lives of the radioactive isotopes produced by the reactor, such radioactive isotopes generally would be more readily available than if they had to be obtained on order from some central organization, such as the Atomic Energy Commission. Furthermore, the utilizing organization would have greater privacy as to the nature of its work, and better control of the chemical and physical form of the samples which are irradiated. In addition, if a large number of isotopes are made, it may be less expensive to make them in one's own reactor than to buy them.

If radioactive isotopes are to be produced in a reactor on the premises of a utilizing organization, it is desirable that the reactor be inherently safe so that it may be used by persons who are not reactor experts without fear of a major accident. In this connection, if the reactor is operated at a good power level, if an unexpected increase or surge in neutron multiplication occurs, the reactor is preferably designed so that the only result which occurs is a rise in the power level to a higher but still non-dangerous level.

To be a useful isotope-producing reactor which operates on the permises of a utilizing organization, the reactor should be designed to allow continuous or intermittent operation with equal ease, but capable of being operated by relatively unskilled operators. It should provide for simultaneously irradiating a large number of samples of various sizes and shapes. The samples should be insertable and removable from the reactor while the reactor is in operation and with minimum handling time. The reactor should have sufficient power so that a wide range of radioactive isotopes can be produced, including the short-lived radioactive isotopes which, as indicated above, have heretofore been unavailable to industry; and finally, the reactor should be available at a relatively moderate cost.

The present invention provides a relatively simple, inexpensive and safe neutronic reactor adapted for producing radioactive isotopes, and having all of the above described necessary and desirable characteristics which render it suitable for use on the premises of a utilizing organization.

A neutronic reactor generally includes an active core containing a moderator and some form of fuel which contains or is formed of fissionable material, a reflector to conserve escaping neutrons, control and measuring elements, some form of provision for heat removal, and suitable shielding. In a neutronic reactor, fast neutrons are produced in the fission process. These neutrons may suffer scattering collisions, mainly elastic, as a result of which their energy is decreased; they may be absorbed by the various materials present in the system; or they may escape. Depending upon the relative amounts and nature of the fuel, moderator, reflector and other substances, their geometrical arrangement and the dimensions of the system, the major portion of the neutron captures leading to fission will take place in a certain energy range. If most of the fissions result from the capture of thermal neutrons, the system is referred to as a "thermal reactor"; if most of the fission processes are due to absorption of neutrons of an energy in an intermediate range, the system is referred to as an "intermediate reactor"; and finally, if the main source of fissions is caused by the capture of fast neutrons, the system is referred to as a "fast reactor." A detailed description of the theory and practice of the design, construction and operation of reactors generally is set forth in various patents and books, and will therefore not be referred to in detail herein. For example, see "The Elements of Nuclear Theory," By Glasstone and Edlund, published 1952, by Van Nostrand Company. Inc.

To sustain a chain reaction, each nucleus in the reactor which captures a neutron and undergoes fission must produce, on the average, at least one neutron which causes fission of another nucleus in the reactor. It has been found convenient to express this condition in terms of an effective multiplication or reproduction factor $K_{eff}$, defined as the ratio of the number of neutrons produced by fission in each generation to the number of neutrons present in the preceding generation. The critical condition is that $K_{eff}$ shall be exactly unity. When $K_{eff}$ is equal to one, a chain reaction will be maintained at a constant rate of fission and power level. If $K_{eff}$ for a reactor exceeds one, the system is said to be super-critical, and, if less than one, the system is said to be sub-critical.

In discussing the characteristics of a neutronic reactor, it is convenient to introduce a further quantity $\rho$, called the reactivity, defined by the relationship $$\rho = \frac{K_{eff} - 1}{K_{eff}}$$

Reactors may also be classified according to the physical condition of the fuel, as either a "heterogeneous reactor" or as a "homogeneous reactor." In a "heterogeneous reactor," bodies of fissionable material or fuel are distributed or arranged in a pattern throughout the moderator. The fuel is generally in the form of discrete lumps which are surrounded by moderator material. In a "homogeneous reactor," the fissionable material and the moderator are combined in a mixture, such that an effective homogeneous medium is presented to the neutrons. Such a mixture may be either a solution of fuel and moderator or a solid mixture of particles of the fuel and of the moderator.

It is a primary object of the present invention to provide a neutronic reactor which is adapted for producing radioactive isotopes. Another object is to provide an inexpensive and safe neutronic reactor for the production of radioactive isotopes which can be successfully operated with a minimum of supervision by relatively unskilled personnel.

Another object of the present invention is to provide a neutronic reactor which is capable of simultaneously irradiating a large number of specimens of various sizes and shapes at selected radiation intensity levels. A further object of the present invention is to provide a neutronic reactor for isotope production in which specimens to be irradiated can be positioned within or removed from the reactor while the reactor is in operation.

Additional objects and advantages of the present invention will be apparent from a study of the following detailed description and from the accompanying drawings.

In the drawings:

FIGURE 1 is a bar graph showing the number of chemical elements of which short-lived radioactive isotopes having a half life between 5 minutes and 100 days and with a saturation specific activity greater than .10 microcurie per milligram can be produced by thermal neutron capture at various reactor power levels for a reactor which produces a flux of $1 \times 10^{10}$ neutrons per square centimeter at the irradiation positions per kw. of power;

FIGURE 2 is a sectional view of a reactor constructed in accordance with the present invention;

FIGURE 6 is an enlarged elevational view partially in section of one of the fuel elements shown in FIGURES 2 and 3;

FIGURE 7 is a partial enlarged plan view of the upper surface of the rotary specimen rack shown in FIGURE 3 with portions thereof cut away to show certain of the inner mechanisms of the specimen rack;

FIGURE 8 is a cross sectional view taken along the line 8-8 of FIGURE 7;

FIGURE 9 is an enlarged side view of the pickup mechanism used for inserting specimens into and removing specimens from the present reactor, the pickup mechanism being shown in engagement with a specimen container within the specimen removal pipe of the rotary specimen rack, the specimen container and removal pipe being illustrated in cross section;

FIGURE 10 is a view similar to that shown in FIGURE 9 but with the pickup mechanism rotated 90° with respect thereto;

FIGURE 12 is an enlarged perspective view of the support assembly and drive mechanism for the pickup mechanism shown in FIGURES 2 and 4;

FIGURE 13 is an enlarged cross sectional view of one of the control rod assemblies shown in FIGURE 3;

FIGURE 14 is an enlarged perspective view of the drive mechanism for operating the control rods used in the present reactor;

Figure 1:
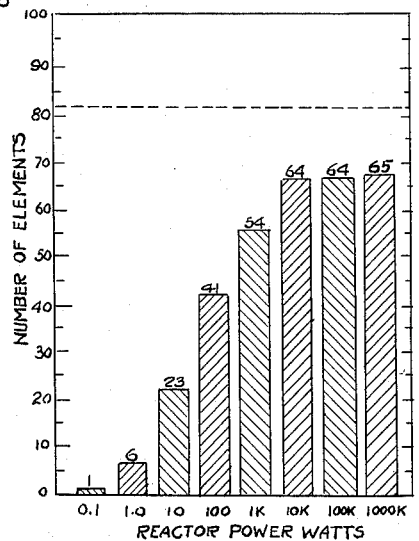

FIGURE 15 is a perspective view of a fuel element lifting assembly which may be utilized in connection with the reactor shown in FIGURE 2; and FIGURE 16 is an enlarged side view of the engaging and indicating unit of the lifting assembly shown in FIGURE 15 with portions cut away and in section to show the engaging and indicating unit in engagement with the upper portion of a fuel element such as is shown in FIGURE 6.

A reactor constructed in accordance with this invention includes a reactive core, a reflector extending about the core, a movable member or specimen rack in the reactor for supporting a plurality of specimens to be irradiated, means for removing a specimen from the specimen rack at a predetermined position in the reactor, and means for moving the specimen rack within said reactor so as to locate any selected specimen within the specimen rack in the predetermined position. While many different types of reactors may be utilized for purposes of this invention, it is preferred, but not essential, that the reactor core be located in a tank which is disposed within a pit in the ground, so that effective shielding against radiation may be afforded in an economical manner, without resorting to expensive above-the-ground shielding structures. The tank is filled with a suitable liquid such as water which serves as a moderator, coolant and shielding. Cooling means may be provided for the fluid within the tank for regulating the temperature of the core.

Other radiation facilities in addition to the movable specimen rack may be provided in the reflector and/or core for irradiating various sizes and shapes of specimens at various radiation intensity levels. Suitable pickup means are furnished to remove the specimens from the reactor while it is in operation. Also furnished in the reactor is an improved control system for regulating the power level of the reactor.

The core of the reactor may be of any suitable construction. However, it is preferable if the core is designed so that the reactor is inherently safe, i.e., it will not be damaged by an unexpected and sudden surge in neutron multiplication. In the illustrated embodiment, the core of the reactor is designed, in combination with the remaining components of the reactor, to have a high prompt negative temperature coefficient of reactivity, hereinafter explained in greater detail. This is responsible for the great safety of the present reactor during its operation.

The worst conceivable mishandling of the reactor consists of suddenly introducing all or a major portion of the available excess reactivity into the reactor. Such excess reactivity is the margin of reactivity increase available in the reactor to overcome conditions which would decrease the reactivity below that necessary for merely sustaining the chain reaction. If the reactivity of the reactor decreases with increasing temperature, it is said to have a negative temperature coefficient of reactivity.

The reactor in order to be safe is constructed so that a sudden addition of excess reactivity will not damage the reactor. This is accomplished by constructing the reactor so that it has a sufficiently prompt negative temperature coefficient of reactivity. By a "prompt" temperature coefficient is meant one which does not require the flow of heat from one region to another in order for it to come into play.

The neutrons within a reactor quickly attain equilibrium with the moderating material. Although the adjustment of the neutron temperature to the temperaure of the moderator occurs very rapidly, and for our purposes may be considered as occurring essentially instantaneously, the response of the moderator temperature to the reactor power level is not necessarily fast. Indeed, in a "heterogeneous" reactor in which the fuel elements are distributed in a definite pattern in the moderator, the response is quite slow, because the independent heat-transfer behavior of the fuel and moderator causes a lag between the induced heat transient in the fuel and the dampening effect of a general temperature rise in the entire core. This lag can result in a melt-down of the fuel or even an explosion of the reactor. On the other hand, in a "homogeneous" reactor, in which the fuel material is more or less evenly dispersed throughout the moderator, the response is essentially instantaneous. In the present reactor we take advantage of this latter characteristic by forming fuel elements which include a homogeneous mixture of a solid moderator and a material fissionable by neutrons of thermal energy such as uranium 235, uranium 233 or plutonium 239.

The desired high prompt negative temperature coefficient of reactivity is obtained by designing the reactor core in accordance with the principles set forth in United States application Serial No. 732,415, by Taylor, McReynolds and Dyson, and entitled "Neutronic Reactor."

In this type of core, a significant contribution to the negative temperature coefficient of the reactivity is obtained from the "fuel element expansion" effect, the "warm neutron" effect, the "leakage" effect and the "neutron Doppler" effect. A further contribution to the negative temperature coefficient of reactivity may be obtained by the controlled use of "poisons" in the reactor.

If the reactivity of the reactor is increased the power level of the reactor will rise, causing the fuel elements to become hotter. As the temperature of the fuel elements increases the fuel element will expand in size, forcing a portion of the cooling water to leave the core of the reactor thereby decreasing the hydrogen density in the core. This will result in an increased leakage of fast neutrons from the core and a decreasing reactivity of the system. This effect is referred to as the "fuel element expansion effect."

The "warm neutron effect" and "leakage effect" operate in the following manner: Suppose the reactivity of the reactor is suddenly increased. Then the fuel and the internal moderator, i.e., the solid moderator which is intimately intermixed with the fuel, becomes hotter and the neutrons within the fuel elements are thereby warmed up. Because of the rise of the average neutron energy, the fission cross section of the fuel is decreased, resulting in a decreased absorption of neutrons in the fuel. A larger proportion of the neutrons escape from the fuel element into the external moderator and a smaller proportion are available for fission. On the other hand, the neutrons which do arrive in the external moderator are rapidly cooled and are then absorbed with a fixed probability independent of the fuel temperature. The differential absorption of neutrons is referred to as the "warm neutron effect." The increased leakage of neutrons from the core and reflector is referred to as the "leakage effect." The net effect is that a higher proportion of neutrons are captured in the external moderator or pass out of the system, and the reactivity of the system is lowered.

By including in the homogeneous mixture of the fuel elements a suitable amount of material having a large number of strong, narrow resonance bands at energies above thermal, one can effect a further significant contribution to the prompt negative temperature coefficient of reactivity. Because the kinetic energy of the nuclei increases with increasing temperature, the width of each of the resonance bands increases with temperature. Since the resonance absorption cross sections are large, essentially all of the neutrons having energies which fall within the widths of the various individual resonance bands in the resonance region are captured. The widening of the resonance bands therefore results in a decrease in the resonance escape probability, notwithstanding the fact that the heights of the resonance peaks are somewhat decreased. The broadening of the resonance bands is generally referred to as the "neutron Doppler effect." While the "neutron Doppler effect" itself is well known, it has been believed that this effect could not provide a sufficient contribution to the temperature coefficient of reactivity in a reactor to play a substantial role in the construction of a safe reactor. We have now found that when a sufficient amount of material having a large number of strong resonance bands at energies above thermal is uniformly dispersed within the fuel elements of a solid "homogeneous" type reactor, so that the amount of resonance absorption is greater than about 3 percent, there will be a significant "Doppler" contribution to the negative temperature coefficient of reactivity of the reactor.

The reactor may also include a material having a high neutron capture cross section distributed in the reactor in a manner such that the absorption of neutrons by this material relative to the absorption of neutrons by the fissionable material increases with increasing temperature. Since the fission cross section of uranium decreases uniformly with neutron temperature, this may be accomplished by the homogeneous distribution of an absorber such as cadmium or samarium for which the capture cross-section increases with neutron temperature because of nearby resonances. It may also be accomplished by the distribution of any strong absorber in individual amounts sufficient to be essentially opaque to thermal neutrons, thus giving absorption independent of neutron temperature. Such materials may be termed "poisons" and may be added either to the fuel element or to the reflector. We have discovered that a moderate amount of "poison" may be used in a reactor without requiring an unduly large increase in the amount of fuel or size and cost of the reactor, while at the same time providing a large contribution to the prompt negative temperature coefficient of the reactor.

We have further discovered that the excess reactivity required in the reactor may be decreased by including a suitable amount of a "burnable poison" such as samarium oxide in the reactor. The amount of "burnable poison" in the reactor preferably should be such that its rate of consumption as far as possible balances the rate of consumption of fissionable material and build-up of fission product poisons during operation of the reactor, thereby prolonging the useful life of the fuel elements.

Other effects which contribute to the negative temperature coefficient of reactivity will also be present in the reactor. However, such other effects do not play an important part in the design of the present reactor. We may include in these further effects the temperature coefficient of coolant expansion, and the effect of neutron temperature on the capture-to-fission ratio of fuel. Since these effects are relatively minor in nature, they will not be further discussed. Complete information on these effects may be obtained from the literature on the reactor theory.

A reactor must have sufficient excess reactivity to overcome the decrease in reactivity due to build-up of "poisons" and fuel burn-up during operation of the reactor, due to neutron absorption by samples being irradiated during operation of the reactor, and due to the increase in temperature during operation of the reactor. For example, the excess reactivity requirement of the reactor may total about .005. In this case the fuel elements of the reactor would include an amount of fissionable material which provides an excess reactivity of at least .005 at the operating temperature of the reactor.

The particular reactor, as illustrated, is designed to operate at a power level of up to about 10 kilowatts at a normal operating fuel temperature of about 40° C. At the 10 kilowatt power level the neutronic reactor illustrated provides an average neutron flux of about $.7 \times 10^{11}$ neutrons per square centimeter per second at the specimen rack located in the reflector.

It has been found that a reactor constructed in accordance with the present invention and having a 10 kilowatt power level has sufficient power to produce most of the radioactive isotopes which would be useful to present-day industry.

It will be noted from the graph shown in FIGURE 1 that, when a reactor operates at about a 10 kilowatt power level, it can produce radioactive isotopes of approximately 64 elements with half-lives between about 5 minutes and 100 days and with a saturation specific activity greater than 0.1 microcurie per milligram. This represents a predominantly large part of the total number of radioactive isotopes with half-lives between 5 minutes and 100 days and with a saturation specific activity greater than 0.1 microcurie per milligram which could be made utilizing a reactor having a 1000 kilowatt power level.

It should be noted that reactors can be constructed in accordance with the principles of the present invention so as to provide much higher power levels and have much higher excess reactivities than are provided by the 10 kilowatt reactor illustrated.

Now referring more particularly to the reactor illustrated in the drawings, the reactor, designated by the reference numeral 20, includes a core 21 disposed near the bottom of a reactor tank 22 which is filled with a liquid 23. The core 21 includes a plurality of fuel elements 24. Disposed in the core 21 are control rod assemblies 25 which are operated by suitable winch mechanisms 26 located above the reactor tank 22. A reflector 27 encircles the core 21. Various irradiation facilities including a movable specimen rack 28 are provided in the core 21 and reflector 27, for irradiating specimens at preselected radiation levels.

Reactor tank 22 is located in a generally cylindrical pit 30. The pit 30 may be constructed by standard construction methods, with the hole lined with concrete, steel or other strong reinforcing material. In the particular assembly illustrated, the lining 31 of the hole is concrete. The depth of the reactor tank 22 is controlled by the amount of liquid shielding desired above the reactor core 21 which is within the tank 22. The width of the reactor tank 22 is controlled by the diameter of the reactor core 21, the size of the reflector 27 and the shielding required to reduce the neutron activity to a desired value at the boundary of the tank. Reactor tank 22 is preferably constructed of a material having a low neutron capture cross section. Since the reactor tank 22 is designed to contain liquid such as water, aluminum is preferred in order to minimize corrosion problems and to also reduce costs of construction. Reactor tank 22 is cylindrical in form with an open top of suitable dimensions to fit inside the pit 30. The bottom of reactor tank 22 is supported in position above a horizontally extending concrete base 32 which forms the bottom of pit 30. The bottom of the tank 22 rests on a platform comprising a flat, generally circular plate 33 preferably of aluminum. The plate 33 in turn is supported on a series of horizontal aluminum beams 29. A porous fill, such as gravel, is placed in an annular space 34 between the wall of the reactor tank 22 and the wall of the pit 30. Any water which may leak into the annular space 34, either from the reactor tank 22 or inwardly from the outside of the concrete lining 31, is collected in a space 35 at the bottom of the pit 30. A suction line (not shown) may be run down through the annular space 34 to remove any water which may collect.

Reactor tank 22 is disposed within the ground in the described manner so that the ground itself acts as a natural protective shielding means for the reactor. Accordingly, construction costs are reduced, since expensive above-the-ground shielding structures are obviated.

A horizontal shelf 36 is preferably provided at the upper end of the pit 30 for the mounting of the control rod winch mechanisms 26, described subsequently. The outer perimeter of the shelf 36 is illustrated as being substantially square, however, the specific contour of the perimeter of the shelf is unimportant. The surface of the shelf 36 is at a sufficient depth from floor level 37 to accommodate the height of the winch mechanisms 26. A channel 38 may be attached to the concrete at each edge of the perimeter of the shelf 36 for support of a two section cover 40 over the pit 30. If desired, a grate may be used for the cover 40 so that the reactor can be visually observed during operation.

Two substantialy parallel, closely spaced channels 41 extend generally diametrically across the top of the tank 22. An angle 42 welded to each of these channels 41 furnishes support for the inner edge of each section of the cover 40. Suitable brackets 43 are attached to the channels 41 and support a plurality of sheaves 44. A cable 45 runs substantially horizontally from each of the winch mechanisms 26 to the adjacent sheave 44, and thence generally vertically to an associated control rod assembly 25.

The reactor tank 22 includes an upper horizontally extending rim or flange 46 which is above the shelf 36 but below floor level 37 so as to allow free passage of the cables 45 between the rim 46 and the cover 40.

The reactor tank 22 is filled with a suitable liquid 23 which acts as a moderator, coolant and shield for the reactor. For these purposes either ordinary or heavy water is acceptable.

Ordinarily, sixteen feet of ordinary water over the core 21 provides adequate shielding of the reactor radiation. Using water as a shield permits one to remove specimens from the reactor and visually observe the core 21 and control rod assemblies 25 during reactor operation. It should be noted that the depth of the reactor pit 30 may be reduced by reducing the amount of shielding liquid 23. However, a large reduction in depth would probably necessitate the placing of a supplementary lead or steel gamma shield over the top of the pit 30.

The water 23 that is used in the reactor tank 22 should be substantially free of impurities; otherwise, the activation of these impurities may be a hazard to operating personnel. Even though the water 23 used initially is distilled, impurities, such as products of corrosion, possible fuel element failure, foreign matter inadvertently dropped into the water, etc., may be introduced. To remove these a demineralizer (not shown) and a filter may be provided.

All of the various structural members disposed within the reactor tank are preferably formed of non-corrodible, mutually compatible materials having a low neutron capture cross section, such as aluminum or stainless steel.

Within the lower portion of reactor tank 22 is located the core 21 which is in the general form of a right circular cylinder and comprises a lattice of generally vertically extending fuel elements 24 held in spaced relation by upper and lower grid plates 47 and 48 respectively.

Referring to FIGURE 6, each of the fuel elements 24 is formed of an elongated, closed cylindrical tube or body 50. The ends of the tube 50 are provided with top and bottom end fixtures 51 and 52 respectively which are welded tightly to the tube 50. The top end fixture 51 includes a lower cylindrical portion 53 which is inserted into and welded to the upper end of the cylindrical tube 50 and a central, upwardly extending elongated cylindrical projection 54 which has an annular groove 55 near the upper end thereof. The groove 55 is engageable by a coacting lifting assembly 56, described subsequently, for vertically removing the fuel element 24 from the reactor core 21. A spacer 57 which encircles and is fixedly secured, as by pinning, to the lower end of the projection 54 provides passages for the flow of liquid 23 through the upper grid plate 47 while at the same time preventing the upper end of the fuel element 24 from wobbling. The spacer 57 has a transverse cross section of an equilateral triangle with rounded corners.

The bottom end fixture 52 includes an upper cylindrical portion 60 which is inserted into and welded to the tube 50, and a central, downwardly extending cylindrical projection 58. An inwardly tapered shoulder 61 is provided adjacent the lower end of the cylindrical projection 58 which supports the weight of the fuel element 24 on the lower grid plate 48 when it is in operating position. The cylindrical projection 58 includes a lower end portion 62 of reduced diameter below the tapered shoulder 61 which guides the fuel element 24 into operating position in the core 21.

The center portion of the cylindrical tube or body 50 of each fuel element 24 is filled with a solid central body 63 comprising a homogeneous mixture of a material fissionable by neutrons of thermal energy, such as uranium 233, uranium 235 or plutonium 239, a solid moderator, such as zirconium hydride, beryllium, beryllium oxide or graphite, and a material having a large number of strong resonance bands at energies above thermal, such as uranium 238 or thorium 232. Each fuel element 24 also preferably contains a "burnable poison," such as samarium oxide. This "poison" may be in the form of samarium oxide-aluminum wafers 64 which are placed at each end of the central body 63 of the fuel element 24.

The upper and lower portions of the cylindrical tube or body 50 of the fuel element 24 preferably contain suitable reflecting and moderating material 65 such as beryllium, beryllium oxide or graphite.

One particularly satisfactory fuel element 24 for use in the specific reactor, which is described herein, was formed with an active portion approximately 1.42 inches in diameter and 14 inches long comprising a uranium-zirconium hydride alloy containing 8 wt. percent of uranium enriched to approximately 20 percent in uranium 235 and 92 wt. percent zirconium hydride, in which the hydrogen atom to zirconium atom ratio was about 1.0. Approximately four inches of graphite was included at each end of the fuel elements. Fifty-six of such fuel elements were included in the core.

Figure 3:
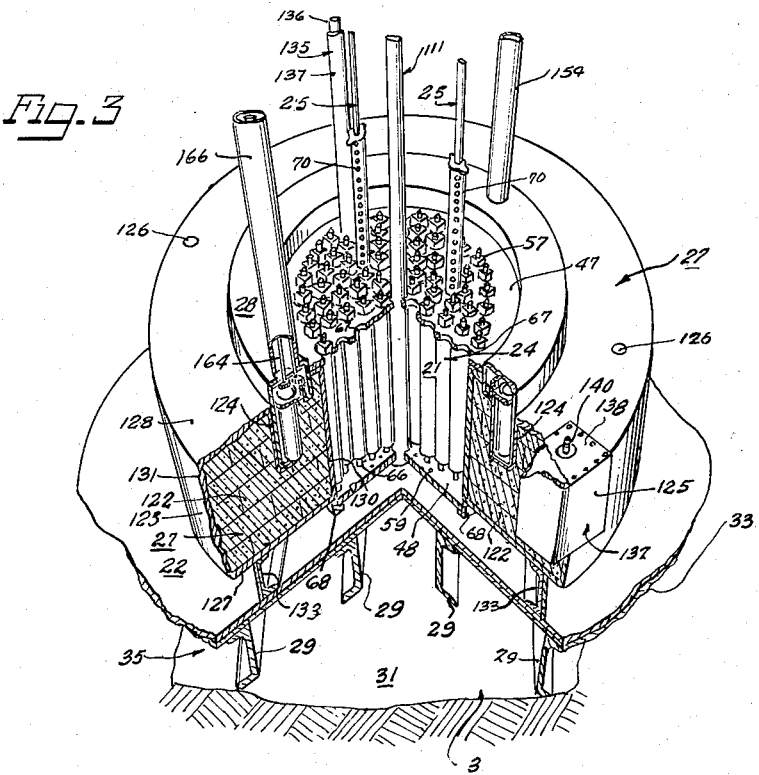
FIGURE 3 is an enlarged perspective view of the core and reflector portion of the reactor shown in FIGURE 2 with a portion thereof cut away to show part of the interior construction.
Figure 4:
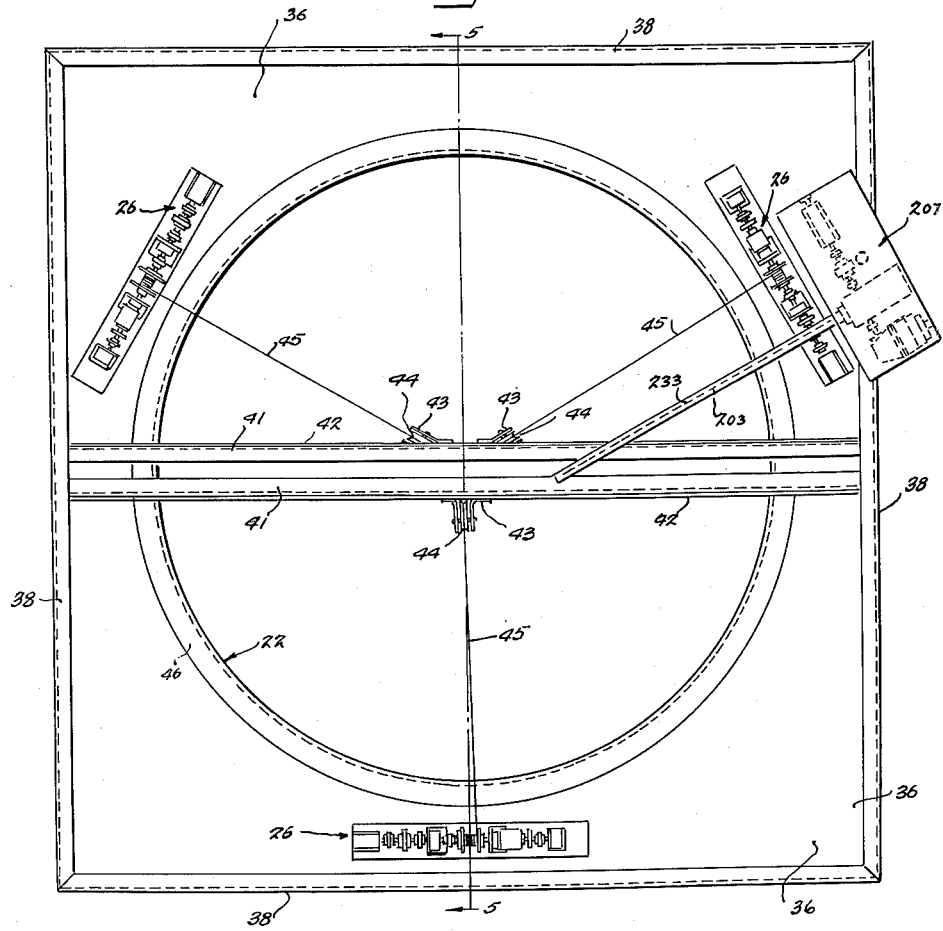
FIGURE 4 is an enlarged top plan view of the reactor shown in FIGURE 2 with the cover members of the reactor removed.
Figure 5:
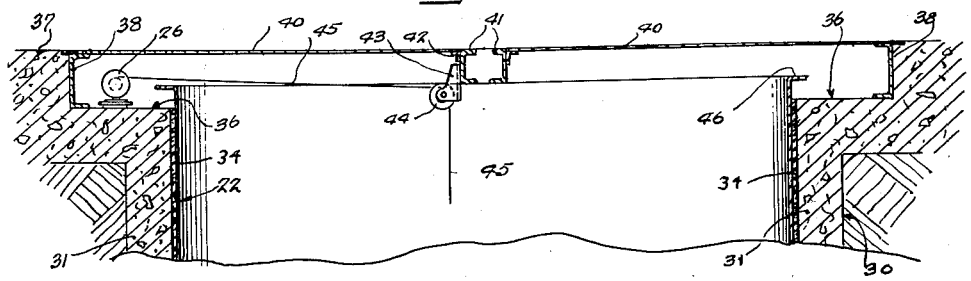
FIGURE 5 is a partial sectional view taken along the line 5—5 of FIGURE 4.

As seen in FIGURES 2 and 3, the fuel elements 24 in the core 21 extend in a generally vertical direction and are generally uniformly spaced in concentric circles. The illustrated reactor provides positions for eighty-six fuel elements 24. The unused positions are occupied by dummy elements which are generally similar in outer construction to the fuel elements 24. The dummy elements are essentially completely filled with a suitable reflecting material such as graphite. It should be understood that the number of fuel elements 24 as compared to the dummy elements will vary considerably, depending upon the general design and dimensions of the reactor and particular arrangement of the fuel elements 24.

Fuel elements 24 are maintained in suitable spaced relation, as heretofore indicated, within the reactor core 21 by means of the pair of vertically spaced, transversely extending perforated grid plates 47 and 48. The grid plates 47 and 48 are spaced apart within the reactor so that when the tapered shoulder 61 of each fuel element 24 rests on the lower grid plate 48, the upper grid plate 47 is located intermediate the spacer 57 of the fuel element 24.

The lower grid plate 48 has a plurality of circular holes 66 extending therethrough (see FIGURE 6), which have their centers on concentric circles and which are suitably countersunk to slidably engage the tapered shoulders 61 of the bottom end fixtures 52 of the fuel elements 24. These holes 66 are spaced so that when the core 21 is assembled approximately 35 percent of the core volume will be made up of water. The lower grid plate 48 also includes a plurality of spaced holes 59 which permit water to flow into the core 21 during operation of the reactor.

The upper grid plate 47 also has a plurality of circular holes 67 extending therethrough which are aligned with the holes 66 in the lower grid plate 48. The diameter of the holes 67 in the upper grid plate 47 are made so as to slidably accommodate the spacers 57 of the fuel elements 24. As may be seen in FIGURE 6, the diameter of the tubular body 50 of the fuel element 24 is slightly less than the diameter of the holes 67 so as to permit the fuel elements 24 to slide easily through the holes 67. All of the weight of the fuel elements 24 is supported by the lower grid plate 48 with the upper grid plate 47 only acting to position the upper portions of the fuel elements 24.

The grid plates 47 and 48, illustrated, have substantially circular outlines. The lower grid plate 48 is made slightly smaller in diameter than the internal diameter of the reflector 27 (described subsequently) and rests on suitably located angled spacers 68 which extend downwardly and inwardly from the lower surface of the reflector 27. The upper grid plate 47 is made slightly larger in diameter than the internal diameter of the reflector 27 and rests on suitably located spacers (not shown) attached to the upper surface of the reflector 27. Each of the grid plates 47 and 48 has ninety-one holes drilled therein, eighty-six of which may be used in the disclosed embodiment as fuel element positions. As described previously, the dummy fuel elements are inserted in the unused fuel element positions. Generally, the fuel elements 24 are placed near the center of the core 21 and the dummy elements are placed towards the outside of the core 21. The remaining holes 67 are used for control rod assemblies 25 and irradiation tubes. The number of control rod assemblies 25 and irradiation tubes may vary depending on the reactor design.

Control rods are generally provided in a reactor for starting up the reactor, operating it at some desired condition, and shutting it down when desired. Ordinarily, material having a large capture cross section for thermal neutrons, such as cadmium, boron, or boron carbide, is fabricated into rods which are easily moved in or out of the reactor. Moving a control rod into the core of the reactor reduces the reactivity of the reactor, conversely moving a control rod out of the core of the reactor increases the reactivity of the reactor. A control rod may be rated according to the reduction of reactivity that occurs when it is fully inserted into a reactor.

In the illustrated embodiment, three symmetrically positioned control rod assemblies 25 are provided. Each of these control rod assemblies 25 includes a control rod which is designed to perform a different function in the reactor so as to achieve both range and accuracy of control. A so-called shim safety rod is used for coarse control of the reactor. The shim safety rod has a fairly large reactivity equivalent. A regulating rod having a smaller reactivity equivalent is provided for fine control of the reactivity. The shim safety rod and the regulating rod each have a reactivity equivalent great enough to shut down the reactor. A third rod having a large reactivity equivalent which may be equal to that of the shim safety rod is used as a safety rod. It has a large enough reactivity equivalent to shut the reactor down and is used to shut down the reactor quickly in the event of an emergency.

In starting up a reactor, the safety rod is removed first. The shim safety rod is then moved partially out of the core. Then fine adjustment of the power level is made by the regulating rod.

In the illustrated embodiment, the three control rod assemblies 25 are similar in construction, only varying by the amount of absorption material contained therein. Referring to FIGURE 13, the control rod assemblies 25 each include a control rod 69 which slides within an outer aluminum guide tube 70. The control rod assemblies 25 are symmetrically supported in the reactor core 21 by the upper grid plate 47, and held from wobbling by the lower grid plate 48.

Each guide tube 70 is inserted into a hole 67 in the upper grid plate 47 and includes two vertically aligned elongated tube sections 71 and 72 which are connected as by welding to an intermediate tubular connecting section 73 having the same wall thickness as the lower section 72. The connecting section 73 has two outwardly extending ears 74 with suitable holes 75 therein through which screws 76 or similar fastening means are inserted into suitable aligned threaded holes in the upper grid plate 47 so as to fasten the guide tube 70 thereto. The lower end of the guide tube 70 has a suitable end fixture 77 which includes a cylindrical portion 80 which is inserted into and welded to the lower end of the lower tube section 72 and a central, downwardly extending cylindrical projection 78. The projection 78 includes a lower end portion 81 of reduced diameter which is inserted into an aligned hole 66 in the lower grid plate 48. The guide tube sections 71 and 72 are perforated to permit the liquid coolant (water) 23 to pass freely through their walls. Attached to the upper end of the guide tube 70 is a flanged collar 82 to which a cap 83 in the form of a hollow circle is fastened by means such as screws. The cap 83 serves to align the control rod 69 and to prevent the control rod from being withdrawn from the guide tube 70. The guide tube 70 extends above the core 21 to a sufficient height to allow the lower end of the control rod 69 to be completely withdrawn from the core 21.

The upper guide section 71 is of a greater internal diameter than the connecting section 73. A shoulder 84, formed by the stepped inner diameter, provides a lower stop, as will hereinafter be described, for the movement of the control rod 69.

The control rod 69 includes an outer tubular casing 85, which encloses suitable absorption material such as boron carbide, a shaft 86 attached and extending upwardly from the upper end of the casing 85, and a dashpot 87 arranged about an upper reduced diameter portion of the shaft 86. The casing 85 comprises a tube 88 of a smaller diameter than that of the lower portion of the guide tube 70 having its lower end sealed with a tapered projection 90 and its upper end sealed by a connector 91 having an upwardly extending threaded projection 92. The connector 91 is threaded into a tapped hole 99 in the lower end of the shaft 86. The lower portion of the shaft 86 has a diameter substantially the same as that of the casing 85. The inwardly stepped outer diameter of the shaft 86 provides a shoulder 93 on which the lower end of the dashpot 87 rests. The upper end of the shaft 86 has an outer threaded portion 94 which engages the upper end of the dashpot 87 and an inner tapped hole 95 by which a magnet assembly 96 is fastened to the control rod 69.

The dashpot 87 which is located on the upper portion of the shaft 86 is used to prevent the control rod 69 from being damaged when it is allowed to drop by gravity into the core 21 of the reactor during the "scram" or shutdown of the reactor. The dashpot 87 includes an outer tubular cylinder 97, an inner tubular cylinder 98 and a coil spring 100. The outer cylinder 97 has an inside diameter slightly larger than the outside diameter of the inner cylinder 98 so as to slidably receive the cylinder 98 therein. The upper end of the inner cylinder 98 has a reduced inner diameter which is tapped to receive the outer threaded portion 94 of the upper end of the shaft 86. The upper end of the inner cylinder 98 has an outwardly extending flange 101 which slidably engages the inside wall of the upper tube section 71. The lower end of the outer cylinder 97 has an inwardly extending flange 102 which slidably engages the shaft 86 immediately above the shoulder 93. The coil spring 100 is located around the shaft 86 in the space formed between the inner walls of the tubular cylinders 97 and 98 and the wall of the shaft 86. The coil spring 100 extends between a shoulder 103 formed at the upper end of the inner cylinder 98 and the lower inwardly extending flange 102 of the outer cylinder 97. Normally, the lower end of the outer cylinder 97 will rest on the shoulder 93. Since the outwardly extending flange 101 of the inner cylinder 98 and the outside surface of the outer cylinder 97 engage the inside wall of the guide tube 70 they help stabilize the control rod 69 within the guide tube 70. If desired, lead (not shown) may be added to the upper portion of the control rod 69 to increase the weight of the control rod.

When the control rod 69 is dropped, the outer cylinder 97 makes contact with the shoulder 84 in the guide tube 70. The control rod 69 compresses the dashpot 87, thus absorbing the shock of the sudden stop and preventing damage to the system.

The magnet assembly 96 fastened to the top of the shaft 86 is used so that the control rod 69 can be quickly released during shutdown. It consists of a head 104 made of ferromagnetic material which includes an upper cylindrical portion 105 having a flat upper surface, a downwardly extending threaded projection 106 which is in engagement with the inner tapped hole 95 in the upper end of the shaft 86, and a generally cylindrical electromagnet 107 slidable within the guide tube 70 and having a flat lower surface adapted to seat on the upper surface of the head 104. The electromagnet 107 is connected by a conduit 108 which extends through the lower end portion of an elongated tube 110 and to a source of electrical power (not shown). A suitable on-off switch or relay (not shown) is provided for controlling the power to the electromagnet.

The tube 110 is suitably attached by its lower end to the top of the electromagnet 107 and at its upper end to the high strength cable 45. The tube 110 has a length such that a portion thereof will extend above the top of the guide tube 70 when the control rod 69 is in its lowermost position. The tube 110 has an opening which permits the conduit 108 to enter the tube 110.

In operation the magnet assembly 96 is lowered until the electromagnet 107 abuts the head 104. The electromagnet 107 is energized, which then allows the control rod 69 to be raised. The control rod 69 may be dropped by deenergizing the electromagnet 107.

While the center of the core 21 may be provided with a control rod assembly 25, in the illustrated embodiment, a tubular irradiation thimble 111 is run vertically through an enlarged central hole in the lower grid plate 48, through the central hole of the upper grid plate 47 and through the reactor tank 22 to the top thereof where it is securely attached to the channels 41. This thimble or "glory hole" 111 is at a point of maximum neutron flux in the reactor. The thimble 111 is useful for isotope production, pile-oscillation experiments, and danger-coefficient experiments.

In the illustrated embodiment, each of the control rods 69 is moved in and out of the reactor core 21 by the winch mechanism 26. The winch mechanism 26, hereinafter described, is especially desirable for lifting and lowering the control rod 69. However, it should be noted that other means may be used for this purpose.

Referring to FIGURE 14, each of the winch mechanisms 26 includes a drive motor and attached torque converter 112, an electrical brake 113, a drum 114, a helipot 115, and a limit switch mechanism 116 arranged in line on a base plate 117, which is (as previously indicated) mounted below floor level 37 on the shelf 36. All of the components of the winch mechanism 26 are commercially available except for the drum 114, and will not be explained in detail.

Each cable 45 extends substantially vertically through the reactor tank 22 from an elongated tube 110 to an associated sheave 44 and then substantially horizontally to the drum 114 of an associated winch mechanism 26. The drum 114 is suitably grooved to receive the cable 45 in an orderly manner. The drum 114 includes end flanges 118 which maintain the cable 45 on the drum 114. The drum 114 is connected to the electric brake 113, which in turn is connected to the drive motor 112. A suitable power servo-system (not shown) may be used for operating the motor 112. Such servo-systems are well known and therefore need not be described herein. Ordinarily, the individual shafts 120 of the components of the winch mechanisms 26 are joined together in axial alignment by flexible couplings. A motor gear reducer unit (not shown) in the motor housing is connected between the drive motor 112 and the shaft 120. The electric brake 113 is connected to the output circuit of the servo-system so as to lock the shaft 120 whenever the drive motor 112 is not in motion. The operation of the electric brake 113 prevents the weight of the control rod 69 from rotating the drum 114 and prevents coasting of the control rod 69.

In one embodiment of the invention the drive motor 112 used is a non-synchronous single phase, instantly reversible motor with a speed of approximately 1780 r.p.m. Using a motor gear reducer unit having a speed reduction of 900 to 1 with the 1780 r.p.m. motor and having one inch pitch diameter on the drum, the resulting linear speed of the control rod is approximately six inches per minute.

The rotation of the shaft 120 is imparted to the helipot 115 and the limit switch mechanism 116. The helipot 115 is used as part of a null balancing bridge circuit in a positioning servo-system (not shown) to indicate the position of the control rod 69. The limit switch mechanism 116 connects into the output circuit of the power servo-system to cut off the power to the drive motor 112 when the control rod 69 is at a minimum and at a maximum position. The limit switch mechanism 116 is adjustable and may be set for any desired travel of the associated control rod 69. For proper operation of the limit switch mechanism 116, the speed of the shaft 120 is increased by a speed increaser 121.

The core 21 is centrally located with respect to the reflector 27. Any material having good scattering properties and a low neutron absorption cross section, such as graphite, beryllium or beryllium oxide, can be used to construct the reflector 27. In the illustrated embodiment a plurality of suitably shaped graphite blocks 122 are used. The reflector 27 is substantially cylindrically shaped with a hollow circular center and is completely encased in a water-tight can 123.

The diameter of the reactor tank 22 is made substantially larger than the outer diameter of the reflector 27 to provide an annular space between the reactor tank 22 and the reflector 27. This space, when filled with water, increases the neutron flux available in the reflector 27, while using the minimum possible size reflector 27. In addition, this annular space facilitates the installation and removal of the reflector assembly 27.

The graphite blocks 122 are encased in the water-tight can 123 so as to prevent water from entering the reflector material and decreasing the reactivity of the reactor. Suitable recesses 124, 125 and 126 are provided in the reflector 27 for irradiation facilities.

The amount and sizes of the various recesses may vary depending upon the installation. In the illustrated embodiment, the can 123 which is preferably formed of welded aluminum includes a lower hollow circular or disc shaped wall or plate 127, an upper generally disc shaped wall or plate 128, an inner tubular wall 130, and an outer tubular wall 131. The upper wall 128 includes an intermediate downwardly extending annular recess or well 124 for receiving a movable specimen rack 28 (described subsequently). The annular recess 124 extends vertically approximately half way into the reflector 27. The walls of the annular recess 124 are formed by suitable aluminum members which are welded together and to the upper walls 128 of the can 123.

A portion 125 of the upper and outer surface of the can 123 is recessed for the receiving of a fairly large, generally rectangular specimen can 132 (described subsequently).

Disposed between the annular recess 124 and the outer edge of the can 123 are two relatively small circular wells 126 which extend into the interior of the can 123 for receiving material having a high neutron absorption cross section. The walls of the wells 126 are formed by aluminum tubes which are closed at their lower ends and which are connected as by welding to the upper wall 128 of the can 123.

Before the parts of the can 123 are attached together, the graphite blocks 122 of the reflector 27 are placed in the can 123 in such a manner as to substantially fill the volume thereof.

The spacers for mounting the upper and lower grid plates 47 and 48 are attached respectively to the upper and lower walls 128 and 127 of the can 123.

Attached to the lower plate 127 of the can 123 are two parallel structural support members 133 such as aluminum channels. If desired, additional cross bracing such as aluminum strips 129 may be provided between the support members 133. The ends of the support members 133 extend beyond the can 123, and on each end a leveling jack 134 is placed to position the reflector 27 in suitable relation to the bottom of the reactor tank 22. Each of these jacks 134 has a round headed base, a vertically extending threaded portion, and a hexagonal top portion. The jacks 134 are inserted into threaded holes in the lower flanges of the support members 133. The jacks 134 are locked in position by means of suitable locking devices such as nuts arranged on the threaded portion. Also attached to the ends of the support members 133 are lifting eyes (not shown) which may be used to raise and lower the reflector 27 into the reactor tank 22.

The amount, size and shape of the radiation facilities provided in the reactor will vary depending upon the requirement of the installation. It should be understood that the description herein is only to show certain preferred types of irradiation facilities that may be used with the reactor.

The radiation facilities provided within the illustrated reactor comprise a pneumatically operated "rabbit tube" 135, the movable specimen rack 28, wells 126 for the irradiation of materials having a high thermal neutron absorption cross section, and the fairly large, generally rectangular specimen can 132 for irradiating objects of irregular size and shape.

A "rabbit" tube is a means for quickly removing isotopes with short half lives from a reactor. Ordinarily, "rabbit" tubes are operated by gas pressure which quickly ejects the specimen from the reactor. In the illustrated embodiment the "rabbit tube" 135 extends into the core 21 through one of the outer holes 67 in the upper grid plate 47 to a depth such that the specimen irradiation position is at the level of the top of the active portions of the fuel elements 24. (At this position the thermal neutron flux is approximately $10^{11}$ neutrons per square centimeter per second when the described reactor is operating at a power level of 10 kw.)

The "rabbit tube" 135 comprises two concentric pipes 136 and 137 extending from the cover 40 down through the reactor tank 22 into the core 21. The pipes 136 and 137 are supported by the channels 41 and the upper grid plate 47 of the core 21. The lower end of the outer pipe 137 is sealed and the lower end of the inner pipe 136 rests against the lower end of the outer pipe 137. The lower end of the inner pipe 136 is suitably notched so that gas may interchange between the annulus between the outer pipe 137 and the inner pipe 136. A source of pressure gas (not shown), such as carbon dioxide, is connected to the annulus.

In operation, a specimen holder (not shown) is either sucked downwardly or fed downwardly by gravity through the inner pipe 136. To remove the specimen holder, carbon dioxide under pressure is applied to the annulus and the specimen holder will be ejected by the pressure difference established.

The wells 126 for the irradiation of material having a high thermal neutron absorption cross section are located in the reflector 27, as described previously, between the annular well 124 for the movable specimen rack 28 and the outer edge of the reflector 27.

These wells 126 extend into the reflector 27 approximately to the depth of the bottom of the active part of the fuel element 24. (Specimens in these wells 126 will be exposed to a thermal neutron flux in the order of $10^{10}$ neutrons per square centimeter per second when the reactor is operating at a power level of 10 kw.)

The recess 125, provided for the generally rectangular specimen can 132 for containing larger or odd shaped specimens to be irradiated, is located, as described previously, at the outer edge of the reflector 27. When not in use, this recess 125 is occupied by a plug of the same material as the reflector 27 encased in a can similar to the generally rectangular specimen can 132, so as not to reduce the efficiency of the reflector 27. The exact size and shape of the recess 125 may, of course, be varied. Also, the recess 125 may be eliminated or, if desired, more than one of these recesses 125 may be provided.

The generally rectangular specimen can 132 has a removable cover 138 fastened thereto which has a cylindrical projection 140 extending vertically therefrom. The upper end of the cylindrical projection 140 is provided with an annular groove similar to that on the top end fixture 52 of the fuel elements 24. The projection 140 is of suitable size so that the lifting assembly 56 which is used to remove the fuel elements 24 can likewise be used to remove the generally rectangular specimen can 132 from the reactor. The specimen to be irradiated is ordinarily embedded in powdered graphite within the generally rectangular specimen can 132. (The thermal neutron flux at the location of the rectangular specimen can 132 is somewhat less than $10^{10}$ neutrons per square centimeter per second when the reactor is operating at a power level of 10 kw.)

The rotary or movable specimen rack 28, which is located, as previously indicated, in the annular recess 124 in the reflector 27, is the main facility for isotope production. (At this location, the thermal neutron flux is about $.7 \times 10^{11}$ neutrons per square centimeter per second when the reactor is operating at a power level of 10 kw.)

Referring to FIGURES 7 and 8, the rotary specimen rack 28 is constructed so that specimens can be loaded and unloaded conveniently during operation. The rotary specimen rack 28 includes a plurality of spaced cups 141 which are attached to and extend eblow a flat, horizontally extending, rotatable ring 142. The cups 141 serve as holders for specimen containers 143, described subsequently. In the illustrated embodiment, the cups 141 are each in the form of a cylindrical tube closed at its lower end. The cups 141 are attached so as to extend downwardly from a series of spaced holes 144 in the ring 142. The number of cups 141 is dependent upon the requirements of the installation. In the illustrated embodiment, forty cups 141 are disposed at equal intervals around the ring 142. The upper surface of the ring 142 is countersunk at each hole 144 so as to guide the specimen containers 143 into the cups 141.

The ring 142 and cups are rotatably supported within a housing 145 by a bearing structure 146. Any bearing structure which allows the ring 142 to be freely rotatable relative to the housing 145 may be used. In the illustrated embodiment, a ball bearing ring structure 146 is used. The ball bearing ring structure 146 includes an inner race 147, an outer race 148, and a plurality of balls 150 rotatably engaged therein. The outer race 148 is fastened securely to a mating recess 151 at the lower inner corner of the ring 142. The inner race 147 is fastened to a mating recess 152 within a bearing support ring 153, which in turn is securely attached to the housing 145, preferably by welding. The ring 142 is rotatable from the top of the reactor to successively bring each cup 141 to a position under a single vertically extending delivery and removal pipe 154.

The housing 145, previously mentioned, is of water tight construction and encloses the internal mechanism of the specimen rack 28. The housing 145 is designed so as to substantially occupy the annular recess 124, and thus minimize the introduction of water into the reflector volume. The housing 145 may be removed from the reactor tank 22 without disturbing the core 21 or reflector 27.

In the illustrated embodiment, the housing 145 is formed by welding or the like and includes a stepped tubular inner wall 155, a tubular outer wall 156, a ring-shaped bottom wall 157, and a ring-shaped top wall 158. The top and bottom portions of the inner wall 155 are of different diameters. The top portion which is of a smaller diameter is connected to the bottom portion by a ring 160 which forms a shoulder which rests on the reflector 27 when the housing 145 is properly positioned in the reactor. Lifting lugs 161 are attached to the upper portion of the inner wall 155 of the housing 145 to facilitate the handling of the rotary specimen rack 28.

A pair of openings 162 and 163 are provided in the top wall 158 for the delivery or removal of specimen containers 143 and for enclosing a drive shaft and a positioning shaft 164 and 165 respectively (described subsequently). In the illustrated reactor the openings 162 and 163 are diametrically opposite to each other. Vertically extending tubes or pipes 154 and 166 which connect with the openings 162 and 163 extend from the top of the housing 145 to the top of the reactor tank 22. The pipes 154 and 166 are preferably formed in mating sections for ease of assembly. The delivery and removal pipe 154 is slightly larger in diameter than that of the cup 141. The lower end of the delivery and removal pipe 154 extends into the housing 145 and is attached therein to a suitable supporting member 167.

The pipe 166 which encloses the drive shaft 164 and the positioning shaft 165 is of larger diameter than that of the delivery and removal pipe 154. A bearing plate 168 for supporting a sprocket 170 and the positioning shaft 165 extends across and is fastened to the inside of the housing 145 at the lower end of the pipe 166. The bearing plate 168 contains two vertically supported bushings 171 and 172 for the positioning shaft 165, and for the drive shaft 164, respectively.

A roller chain 173 and sprocket 170 are used to rotate the ring 142 and cups 141. The chain 173 extends along the upper surface of the ring 142 and is fastened at spaced intervals thereto. Any suitable fastening means can be used to secure the chain 173 to the ring 142 such as riveting.

Figure 11:
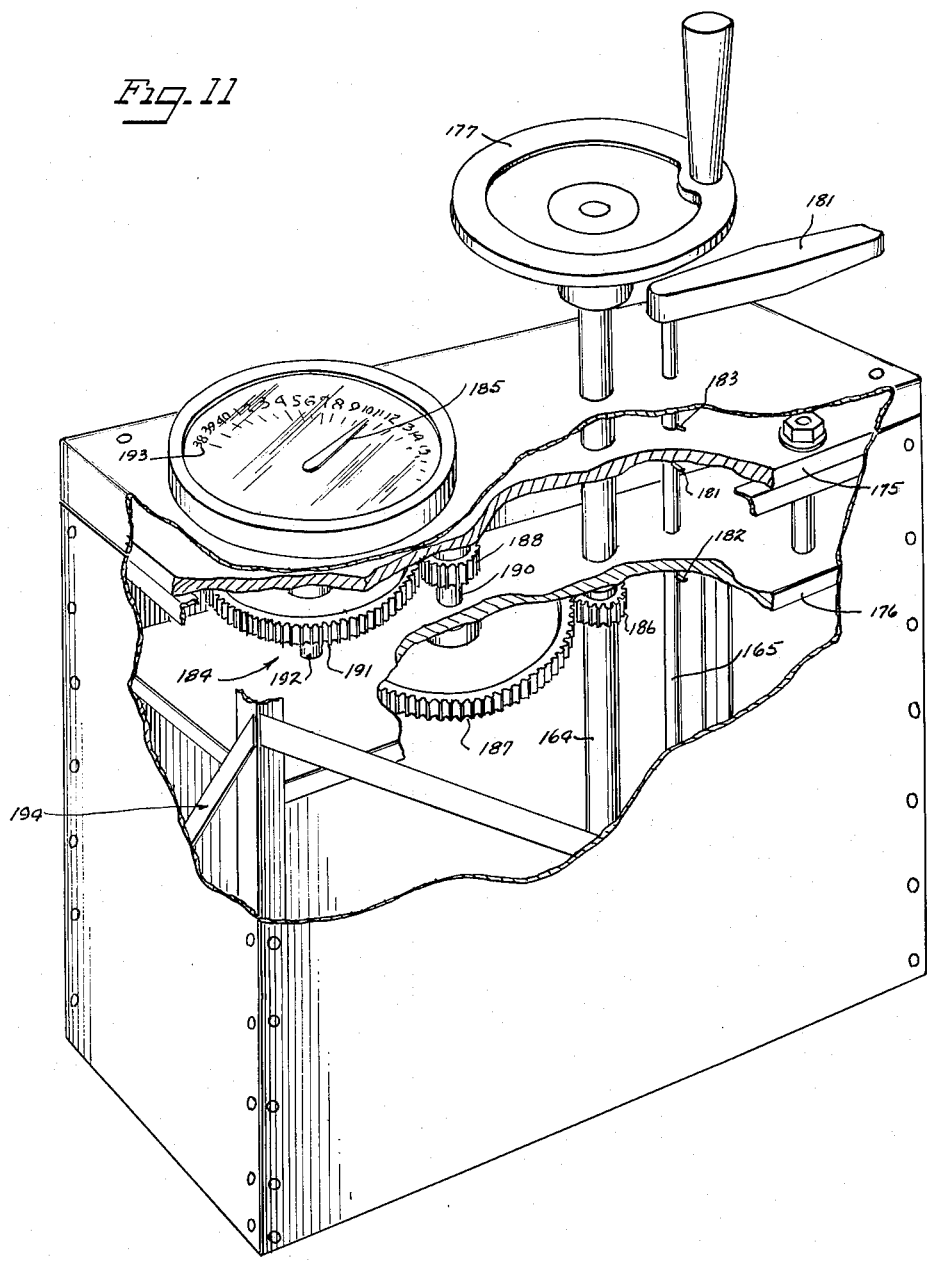
FIGURE 11 is an enlarged perspective view of the specimen rack operating and indicating mechanism used in connection with the reactor shown in FIGURE 2 with portions cut away to show certain of the interior mechanism thereof.

The sprocket 170 is fastened to the lower end of the drive shaft 164 beneath the bearing plate 168. The sprocket 170 engages and drives the roller chain 173. Thus, the rotation of the drive shaft 164 causes a correlative rotation of the ring 142. A collar 174 is attached to the drive shaft 164 above the bushing 172 to maintain the sprocket 170 in vertical alignment with the roller chain 173. The drive shaft 164 extends upwardly through the pipe 166 to the top of the reactor tank 22. As seen in FIGURE 11, the upper end of the drive shaft 164 extends through a pair of vertically spaced bearing plates 175 and 176. Attached to the upper end of the drive shaft 164 is a turning means, such as a hand wheel 177.

A positioning hole 178 is drilled in the ring 142 adjacent each cup 141 to insure proper positioning of the cups 141 relative to the delivery and removal pipe 154. The holes 178 are so located that whenever the positioning shaft 165 drops into a hole 178 one of the cups 141 is in alignment with the delivery and removal pipe 154. The holes 178 are located on the upper surface of the ring 142 and are of a diameter such that the positioning shaft 165 may be slidably engaged therein. The positioning shaft 165 extends through the pipe 166 to the top of the reactor. Preferably, the positioning shaft 165 is in more than one section for ease of assembly. The upper end of the positioning shaft 165 extends through the bearing plates 175 and 176. A suitable gripping means, such as a handle 181 is attached to the upper end of the positioning shaft 165.

The positioning shaft 165 includes a pair of vertically spaced, horizontally extending pins 181 and 182 located adjacent its upper end which coact with the bearing plates 175 and 176 to prevent excessive withdrawal of the positioning shaft 165 and to maintain the positioning shaft 165 out of engagement with the holes 178 during the period that the specimen rack 28 is rotated. The lower pin 182 is positioned below the lower bearing plate 176 a distance such that when the lower end of the positioning shaft 165 is raised above the surface of the ring 142 to permit the specimen rack 28 to rotate, the lower pin 182 will abut against the lower surface of the lower bearing plate 176. The upper pin 181 is so located on the positioning shaft 165 as to just clear a suitably slotted hole 183 in the upper bearing plate 175 before the positioning shaft 165 is stopped by the lower pin. To lock the positioning shaft 165 in its uppermost position, the positioning shaft 165 is rotated until the upper pin 181 is no longer in alignment with the slot after which the positioning shaft 165 is released. The positioning shaft 165 will be maintained in its raised position by the engagement of the upper pin 181 with the upper bearing plate 175.

If desired, a biasing spring (not shown) may be provided to urge the positioning shaft 165 in a downward direction so as to prevent accidental release of the positioning shaft 165 when it is in engagement with one of the holes 178.

To indicate the position of the ring 142, the drive shaft 164 is connected through a suitable gear train 184 to an indicating pointer 185. The gear train includes a pinion gear 186 attached to the upper end of the drive shaft 164, a pair of idler gears 187 and 188 which are attached to an idler shaft 190 and a spur gear 191 attached to an indicator shaft 192 on which the pointer 185 is mounted. The idler shaft 190 and the indicator shaft 192 are journaled in suitable bearings (not shown) located in the bearing plates 175 and 176. The indicating pointer 185 is arranged to move across an indicating dial 193 as the drive shaft 164 rotates the ring 142. The indicating dial 193 is suitably calibrated so as to indicate the positions of the ring 142 where the cups 141 are in alignment with the delivery and removal pipe 154.

A housing 194 which is suitably supported above the reactor tank 22 on the channels 41 is provided for supporting the bearing plates 175 and 176 in spaced apart relationship and for enclosing the bearing plates 175 and 176, and the gear train 184.

In operation, the positioning shaft 165 is raised and then locked in its uppermost position by its handle 181. This allows the ring 142 to be rotated by the drive shaft 164. The hand wheel 177 is rotated until the indicating pointer 185 denotes that the desired cup 141 is under the delivery and removal pipe 154. The positioning shaft 165 is then rotated to align the upper pin 181 with the slot in the hole 183 and lowered into the positioning hole 178 in the ring 142, locking the ring 142 in position.

To prevent moisture from accumulating within the housing 145, one or more of the cups 141 may be provided with suitable perforations or openings 189 and these cups may be loaded from time to time with removable charges of a suitable drying agent such as silica gel. In one embodiment, for example, four spaced cups were suitably perforated, each with approximately forty ¼ inch diameter holes. In addition, one of the cups included a central ⅝ inch hole in its bottom wall to permit a sponge or other absorbent material to be lowered therethrough into contact with the bottom wall of the housing 145 to test for the amount of moisture within the housing.

In order to determine the positions of the perforated cups, the positioning hole 178 associated with one of the perforated cups is somewhat deeper than the rest of the positioning holes, so that when the positioning shaft 165 drops to a lowermost position, it denotes that its perforated cup is in line with the delivery and removal pipe 154. Preferably, the indicating mechanism is adjusted so that at the position where the positioning shaft 165 is in line with the deeper positioning hole 178, the pointer 185 will point to the dial 193 at some definite marking, for example, position number 1. Knowing the relative positions of the other perforated cups, one can readily rotate the specimen rack to position any desired perforated cup under the delivery and removal pipe 154 by reference to the position of the indicating pointer 185.

Referring to FIGURES 9 and 10, each specimen container 143 which is adapted to carry a specimen to be irradiated, is made of such a size that it may be inserted into a cup 141 of the rotary specimen rack 28. The specimen container includes a tube 195 that has its bottom end closed. The bottom edge of the tube 195 may be chamfered to facilitate the insertion of the specimen container 143 into a cup 141. Attached to the upper end of each tube 195 by threading, rolling, crimping or the like, is a lifting extension 196. The lifting extension 196 has a transverse wall 197 across its lower end which provides a closure for the upper end of the tube 195 and has a vertically extending tubular wall 198. A head portion 199 is threaded, crimped, or otherwise joined to the upper end of the tubular wall 198. The head portion 199 slopes downwardly and inwardly into the tubular wall 198 and terminates in a substantially horizontal lower shoulder 201 which extends outwardly to the wall 198. The head portion 199 is adapted for engagement with a coacting pickup mechanism 202.

The pickup mechanism 202 is used to deliver the specimen containers 143 and to remove the specimen containers 143 from the cups 141 of the rotary specimen rack 28. In the illustrated embodiment, the pickup mechanism 202 includes a cable 203, a cable clamp 204, an electric solenoid 205 and a pickup linkage 206. A suitable specimen container hoist 207, positioned above the top of the reactor tank 22, is used to lower the containers 143 into and raise the containers 143 from the cups 141. The solenoid 205 which may be of standard construction has an over-all diameter less than that of the delivery and removal pipe 154. The cable 203 performs the dual function of furnishing electric power to the solenoid and providing a means of raising and lowering the pickup mechanism 202. The cable 203 is mechanically supported by the cable clamp 204 which is attached to the top of the solenoid 205. The cable clamp 204 is composed of top and bottom flange members 208 and 210 and a common web member 211. The bottom flange member 210 has a hole through its center and a transverse groove on its bottom surface through which the cable 203 is threaded for electrical attachment to the solenoid. The top flange member 208 of the clamp 204 is in two sections and has a centrally located hole 212 of a diameter less than that of the cable 203. The cable 203 is placed between the two sections and the sections are fastened together, thus compressing the cable 203.

The pickup linkage 206 includes two parallel outer arms 213 attached at their upper ends to the casing of the solenoid 205, and two movable linkages 214 inside of the outer arms 213 pivotally mounted to the lower end of an outwardly biased plunger 215 within the solenoid 205 and to the lower end of the outer arms 213. The movable linkages 214 are each composed of two arms 216 and 217 pivotally joined together intermediate the solenoid 205 and the lower ends of the outer arms 213. When the solenoid 205 is de-energized the junctions between the lower and upper arms 216 and 217 of the movable linkages 214 will extend outwardly in opposite directions to approximately the inside diameter of the lifting extension 196. In this position the upper ends of the lower arms 216 have flat horizontal surfaces 218 which are engageable by the end flange 201 of the lip 200 of the lifting extension 196. When the solenoid 205 is energized, the plunger 215 moves upwardly, which reduces the outward extension of the junctions between the lower and upper arms 216 and 217 so as to allow the pickup linkage 206 to pass inside the lip 200 of the lifting extension 196.

In operation, the pickup linkage 206 is inserted into the lifting extension 196 either by manually pressing the pickup linkage into the lifting extension or by temporarily energizing the solenoid 205 and then dropping the pickup linkage into the lifting extension, after which the specimen container 143 may be lowered through the delivery and removal pipe 154 into one of the cups 141 of the specimen rack 28. The solenoid 205 is energized and the pickup linkage 206 is removed from the lifting extension 196. The height of the specimen container 143 should be such that when a plurality of containers 143 are inadvertently stacked one above the other in the delivery and removal pipe 154 and underlying cup 141, they will not interfere with the subsequent rotation of the ring 142. The process is reversed for removal of a specimen container 143 from the rack 28. However, the bias on the solenoid's plunger 215 may be in such a relationship to the weight of the pickup mechanism 202 that the plunger 215 will be forced upwardly when the pickup mechanism 202 is lowered into contact with the specimen container 143. In this manner the pickup mechanism 202 will enter the specimen container 143 without the necessity of energizing the solenoid 205.

Upon removal from the reactor, the irradiated specimen may be engaged by remote handling tongs and placed in a suitable lead transfer cask located adjacent the reactor. Alternatively, the irradiated specimen may be enclosed directly in a suitable lead transfer cask 220 to protect the operating personnel from radiation. The transfer cask 220 may be substantially rectangular with a circular hole (not shown) through its center. The cask 220 preferably includes retractable top and bottom plates (not shown) which close off the top and bottom of the central hole.

Referring to FIGURE 12, the specimen container hoist 207 includes a drive motor 221, a reel 222 rotatably connected to the drive motor 221 through a speed reducer 223, and a limit switch mechanism 224 connected to the reel 222 through a speed increaser 225. These components are arranged in line on a base plate 226, which is suitably mounted alongside the reactor tank 22. All of the components of the specimen container hoist 207 are commercially available and are not explained in detail.

As previously indicated, the cable 203 which is attached to the solenoid 205 of the specimen container pickup mechanism 202 delivers electric power to the solenoid 205 and at the same time supports the specimen container 143 as it is lowered and raised. This eliminates the need for separate cables for power and for support purposes. The cable 203 is received by the reel 222, which is provided with brushes and commutators so as to maintain electrical connection to a power source (not shown) as the reel 222 is rotated.

The reel 222 is suitably hung from an overhanging arm 227 of a C-shaped support 228. The C-shaped support 228 is attached by its lower arm 230 to the base plate 226 by bolts or similar means. One end of the shaft of the reel 222 is connected by means of a flexible coupling to the output shaft of the speed reducer 223, which reduces the speed of the drive motor 221 so that the cable 203 is not wound or unwound at too great a speed. The input shaft of the speed reducer 223 is connected to the drive motor 221 which is mounted to the base plate 226.

The other end of the shaft of the reel 222 is connected to the input shaft of the speed increaser 225 by means of a flexible coupling. The speed increaser 225 is mounted on a support suitably fastened to the base plate 226. The output shaft of the speed increaser 225 is connected to the limit switch mechanism 224 by means of a flexible coupling. The limit switch mechanism 224 is mounted to the base plate 226 by means of bolts or the like. The speed increaser 225 is provided in order that the accuracy of the adjustment of the limit switch mechanism 224 is within the tolerance necessary for proper operation of the specimen container hoist 207.

The limit switch mechanism 224 is connected into the drive motor circuit (not shown), so as to de-energize the motor 221 and thus limit the travel of the cable 203. Generally, the limit switch mechanism 224 is set so as to de-energize the motor 221 either when the specimen container 143 is fully inserted into the cup 141 of the rotary specimen rack 28, or when the specimen container 143 is raised to a desired position outside the reactor tank.

In one embodiment of the invention the drive motor 221 was an instantly reversible, single phase, non-synchronous motor with a speed of approximately 1750 r.p.m. Using a speed reducer 223 having a speed reduction of 60 to 1 with the 1750 r.p.m. motor, and having an average pitch diameter of 4 inches on the reel 222, the resulting speed of the cable 203, and thus the container 143, was approximately 55 inches per minute.

The base plate 226 is mounted on the upper cross member 231 of a generally T-shaped support 232 which is rotatably mounted to one of the channels 38, which forms one of the edges of the shelf 36 at the upper edge of the reactor pit 30. The cross member 231 is a flat, elongated, horizontally disposed, rectangular plate which is fastened to an upright pipe or tube 235 by means of a pipe flange 236 which is mounted to its lower surface by means of bolts or the like. An overhanging arm 233 which supports a sheave 234 at its outer end extends transversely from the cross member 231 of its T-shaped support 232. The overhanging arm 233 may be any suitable structural member such as a rectangular conduit, angle bar, channel member, or the like. In the illustrated embodiment, the overhanging arm 233 is composed of a generally rectangular conduit 233 which has a slot (not shown) in its lower surface adjacent its outer end. The sheave 234 is mounted in the outer end of the rectangular conduit 233 and partially within the slot by means of a forked support 238 so that the shaft 240 which supports the sheave 234 extends horizontally. As shown in FIGURE 12, the shaft 240 is disposed in suitable holes adjacent the ends of the arms of the forked support 238. The forked support 238 is fastened to the inner surface of the lower side of the overhanging arm 233 by bolts or similar means. The T-shaped support 232 is rotatably mounted so that the overhanging arm 233 may be swung from its normal position overlying the reactor tank 22 to a position on one side thereof for easy accessibility into the interior of the reactor.

The base plate 226 of the specimen container hoist 207 is suitably mounted in a centrally located slot 241 in the upper surface of the cross member 231 by means such as rotatable clamps 242. A housing 243 which is seated around the perimeter of the cross member 231 may be provided for enclosing the specimen container hoist 207.

The lower end of the upright pipe 235 is rotatably mounted in a circular recess 244 in the upper surface of a generally rectangular base support 245. An elongated cylindrical support rod 246 of a diameter just less than that of the upright pipe 235 extends upwardly from the bottom of the recess 244 into the lower portion of the upright pipe 235 to provide added support for the upright pipe 235. The base support 245 is suitably attached, as by welding or the like, to the web of one of the channel members 38, which forms one side of the shelf 36. The upper flange of the channel member 38 is cut away, and the lower surface of the base support 245 is notched so as to allow the base support 245 to be abutted against this web.

A movable locking member 247 is provided on the upper surface of the base support 245 for preventing the rotation of the T-shaped support 232. The locking member 247 includes a horizontally extending finger 248 which is slidable into and out of engagement with a suitable hole 250 in the side wall of the upright pipe 235. The locking member 247 is adjustably attached to the base support 245 by means of a pair of bolts 251 which extend through a slot 252 in the locking member 247.

In order to provide heat removal from the reactor system, cooled water 23 is arranged to flow by natural circulation past the fuel elements 24. The water 23 is cooled by a cooling coil 253 located adjacent the wall of the reactor tank 22 above the reactor core 21. The cooling coil 253 is part of a common vapor compression refrigeration system utilizing Freon. The refrigeration system may include a motor-compressor assembly (not shown) for compressing the refrigerant, an air-cooled condenser (not shown), and the cooling coil or evaporator 253. The motor-compressor and condenser are well known and will not be explained.

The cooling coil 253 is sufficiently spaced above the core 21 so that the neutron and gamma flux from the reactor core 21 do not produce either appreciable activation or radiation decomposition of the Freon. Preferably, the cooling coil 253 has the general shape of a toroid having a plurality of generally circuit coils arranged one above the other, and a common inlet and outlet pipe. The toroid has an internal diameter large enough that the rotary specimen rack 28, the control rods 25, the core 21, and the reflector 27 can be removed. It may be supported from the top of the reactor tank 22 by suitable hangers (not shown).

In operation, the circulation of water 23 in the reactor tank 22 is generally downward along the outer portion of the reactor tank 22 from the region of the cooling coil 253 to the bottom of the reactor tank 22 up through the reactor core 21 and thence back to the region of the cooling coil 253. The lower grid plate 48 of the core 21, as described previously, is supported by a plurality of spacers 68. This arrangement provides a passageway for the water 23 between the reflector 27 and the lower grid plate 48. In addition, water flows through the holes 59 in the lower grid plate 48. Also, as described previously, at the upper grid plate 47 the spacers 57 of the fuel elements 24 are shaped to provide passageways for the water 23.

To hold the water temperature leaving the region of the cooling coil 253 substantially constant, an automatic temperature controller or thermostat having a remote bulb (not shown) is generally provided. Preferably, the bulb is located approximately one foot below the cooling coil 253 in the stream of cooled water 23.

In the illustrated reactor the temperature controller is adjustable between about 15° C. and about 75° C., and the refrigeration system is designed for 50,000 B.t.u. per hour load.

In order to insert fuel elements 24, dummy elements, or the can 132 for the larger specimens into or to remove these members from the reactor tank 22, the lifting assembly 56 is provided (see FIGURES 15 and 16). The lifting assembly 56 includes a winch 249 attached generally centrally to an inverted L-shaped arm 254, a cable 255 which extends from the winch around a sheave 256 attached to the outwardly extending leg 257 of the arm, and an engaging and indicating unit 258 which is attached to the end of the cable 255. A suitable ratchet mechanism 286 may be provided on the winch 249 to prevent the lowering of the cable 255 unless the ratchet mechanism is in a disengaged position.

The engaging and indicating unit 258 includes an outer tubular sleeve 259 which has its lower end portion suitably cut away to provide a plurality of legs 260 and an inner, slidable engaging head 261. The head 261 is adapted for automatically interengaging and locking with the top and fixture 51 of a fuel elmeent 24 or of a dummy element, or the projection 149 on the specimen can 132. The engaging head 261 includes an upper weighted section 262 formed of lead and a lower section which includes a cylinder 263 and a piston 264 slidable therein. The piston 264, which is a tube having an upper end closed, has a plurality of balls 265 encaptured in inwardly tapered, circumferentially spaced apertures 266 adjacent its lower end. The balls 265 extend partially into the interior of the piston 264 when the piston is in a lower position. When the piston 264 is moved to an upper position, the balls 265 are opposite a groove 267 in the interior of the cylinder 263. Normally, the piston 264 is kept in its lower position by the pressure of a compression spring 268 acting on its upper surface. A lip 269 at the lower end of the cylinder 263 functions as a stop for the downward movement of the piston 264. The lip 269 has a tapered surface which aids in the alignment of the head 261 with the top end fixture 51 of a fuel element 24.

The upper portion of the cylinder 263 is suitably attached as by threading to the weighted section 262.

A spacer 271 which is attached to the upper end of the piston 264 limits the upward movement of the piston by striking the lower surface of the weighted section 262. An operating cable 272 is fastened to the upper end of the piston 264 and extends upwardly through passageways 273 in the upper weighted section 262.

The engaging head 261 is slidably maintained within the outer sleeve 259 by suitable threaded pins 274 which extend through elongated slots 275 within the outer sleeve and into the upper weighted section 262 of the engaging head 261. The pins 274 are suitably attached to suspending cables 276 which are joined together above the engaging and indicating unit and either connect with or form the cable 255. A cylinder of lead 277 is provided within and attached to the upper end of the sleeve 259. The operating cable 272, previously referred to, extends upwardly through a suitable passageway 278 in the lead cylinder 277 and is of sufficient length so that the end of the cable will remain above the reactor tank during use of the engaging unit. A water proof switch 280 is attached to the lower end of the lead cylinder 277 in a position to slightly offset with respect to the center of the sleeve 259. Leads from the switch 280 extend through a suitable passageway 281 in the lead cylinder 277 and extend to a suitable source of power and a signal device such as a buzzer (not shown). Unless the lower end of the sleeve 259 is in contact with a surface, the upper surface of the weighted section 262 of the engaging head 261 will be in contact with the switch 280. The switch 280 is normally closed so that this contact maintains the switch 280 in open condition. As soon as the legs 260 of the sleeve 259 engage and seat upon a surface, the lowering of the cable 255 will cause a lowering of the head 261 relative to the sleeve 259. This will open the switch 280, causing the operation of the signal device. The relative dimensions of the sleeve 259 and engaging head 261 are such that the switch will close when the legs of the sleeve 259 seat on the upper grid plate 47 and a fuel element 24 is properly positioned within the core.

Suitable wells or recesses 283 are spaced about the upper surface of the reactor for supporting the lower end of the vertical leg 284 of the L-shaped arm 254.

To interengage the engaging head 261 of the lifting assembly 56 with, for example, a fuel element 24 located within the reactor, the leg 254 which is within a suitable recess is rotated until the cable 255 positions the engaging and indicating unit approximately above the fuel element 24. The ratchet mechanism 286 is released and the winch rotated until the engaging head 261 reaches the general level of the upper end of the fuel element 24. The cable is guided and lowered so that the head 261 drops downwardly over the top end fixture 51 of the fuel element 24. As the weighted head 261 drops over the end fixture 51, the legs 260 of the sleeve 259 will engage upper grid plate 47. Further lowering of the cable 255 causes the weighted head 261 to move downwardly within the sleeve 259. As the head 261 continues its descent, the fuel element 24 pushes the piston 264 upwardly until the balls 265 move outwardly into the groove 267 in the cylinder 263. This outward movement of the balls 265 allows the upper part of the top end fixture 51 of the fuel element 24 to bypass the balls 265. As the head 261 continues its downward movement over the end fixture 51 of the fuel element 24, the upper portion of the groove 55 in the end fixture 51 will eventually reach a point where it will be capable of partial engagement with the balls 265. When this point is reached the spring 268 will force the piston 264 downwardly and this in turn will cause the balls 265 to snap into engagement with the groove 55. When the head 261 drops to the point where the head 261 engages the end fixture 51 the switch 280 moves to closed position thereby actuating the signal device. The fuel element 24 may be raised by rotating the winch in the proper direction. To release the fuel element 24, the operating cable 272 is pulled upwardly, lifting the piston 264.

Various reactor physics parameters may be varied within relatively wide limits in designing the above described reactor without departing from the nature and scope of the present invention. For purposes of illustration, the design specification for a 10 kilowatt reactor of the type described is set forth below.

Outer structure:
    Reactor pit, concrete lined ___ 6 ft. 6 in. I.D. x 20 ft. 9 in. deep.
    Reactor tank, aluminum _____ 6 ft. diam. x 19 ft. 8 in. deep x ½ in. thick.

Core geometry: A cylindrical array of 56 aluminum clad fuel elements, 3 control rods, 30 dummy (graphite) fuel elements and 2 irradiation facilities, arranged in concentric circles as follows:

| | Diameter, inch | | Uniformly spaced holes |
|---|---|---|---|
| Center | | 1 | 1 irradiation facility. |
| 1st circle | 3.2 | 6 | 6 fuel elements. |
| 2d circle | 6.3 | 12 | 12 fuel elements. |
| 3d circle | 9.4 | 18 | 15 fuel elements, 3 control rods. |
| 4th circle | 12.5 | 24 | 23 fuel elements, 1 dummy fuel element. |
| 5th circle | 15.6 | 30 | 29 dummy fuel elements, 1 irradiation facility. |

Fuel element specification:
    Diameter _____ 1.42 in.
    Length of active portion _____ 14.0 in.
    Aluminum cladding thickness ____ .030 in.
    Weight of active portion _____ 2,250 grams.
        Zirconium ____ 92% by weight
        Uranium _____ 8% by weight
    Uranium enrichment _____ 20% $U^{235}$.
    Hydrogen atoms/zirconium 1.0.
        atoms.
    Hydrogen atoms/uranium 238 50.
        atoms.
    Burnable poison _____ Samarium oxide-aluminum wafers (approximately 1% by weight of samarium oxide), 0.05 in. thick and 1.40 in diameter, located above and below the active portion of each fuel element.
Critical mass _____ Approximately 1.95 kg. of $U^{235}$.
Reflector:
    Material _____ 1.65 density graphite, aluminum clad.
    Thickness—
        Radial _____ 12 in.
        Top and bottom of fuel elements. 4 in.

Thermal characteristics (continuous operation):
    Power _____ 10 kw.
    Cooling method _____ Water circulated by natural convection.
    Refrigeration capacity _____ 7½ tons.
    Cooling Coil:
        Number of Coils _____ 26.
        Dimensions of the tube forming the coil. 1⅝ in. O.D. x 0.065 in. wall.
        Diameter of Coil:
            Inner spiral _____ 5 ft.
            Outer spiral _____ 5 ft. 6 in.
        Location of the lowermost turns of the coil. 4 ft. above the core.
    Water Temperature:
        Core inlet _____ 30° C.
        Core outlet _____ 38° C.
    Coolant flow rate _____ 13 g.p.m.
    Coolant average velocity in core __ 0.05 ft./sec.
    The reactor can be operated intermittently at powers up to 30 kw.
Water volume in the core _____ Approximately 35 percent.
Aluminum in the core _____ Approximately 8 percent.
Control:
    Boron carbide control rods _____ 3.
    Drives _____ Winch type.
    Maximum withdrawal rate _____ 6 in./min. (15.2 cm./min.).
Shielding:
    Material _____ 16 ft. of water over core.
    General radiation level above water (at 10 kw. power). Less than 0.25 mrem./hr.
Experimental and irradiation facilities:
    Rotary specimen rack _____ 40-position rotary specimen rack located in aluminum-clad graphite reflector 3 in. from edge of core (for 50-cc. specimen containers 1 in. diam. x 4 in.).
    Rabbit tube _____ 1.0 in. I.D., located near edge of core.
    Special irradiation facility _____ 5 in. x 7 in. x 14 in. deep, located near outer edge of reflector.
    Central thimble (glory hole) _____ 1 in. diameter.
    Reflector _____ Top face of graphite reflector.

This reactor has a neutron flux of about $.7 \times 10^{11}$ neutrons per square centimeter per second at 10 kw. at the specimen rack located in the reflector and an average core neutron flux of about $1.0 \times 10^{11}$ neutrons per square centimeter per second. The neutron flux at the center of the core is about $1.5 \times 10^{11}$ neutrons per square centimeter per second.

The excess reactivity of the reactor is about 0.5% and the prompt negative temperature coefficient of reactivity is about $7 \times 10^{-5}/°$ C. The large negative temperature coefficient of reactivity results from a "fuel element expansion" contribution of about $2.0 \times 10^{-5}/°$ C., a "warm neutron" contribution of about $1 \times 10^{-5}/°$ C., a "leakage" contribution of about $2 \times 10^{-5}/°$ C., and a "neutron Doppler" contribution of about $2 \times 10^{-5}/°$ C. A temperature increase of about 60° C. will therefore produce a drop in reactivity of about .004. Thus, if 0.4% excess reactivity is suddenly added to this reactor the temperature of the core will rise from about 34° C. to about 94° C. at which point the excess reactivity added to the system will be fully counterbalanced by a corresponding drop in reactivity due to the high negative temperature coefficient. If the rate of cooling of the reactor is neglected, the temperature of the fuel will "over shoot" to approximately 150° C., at which temperature the reactor will be distinctly subcritical. In a reactor which is being cooled during the excursion, the peak temperature will of course be considerably less than 150° C.

If a greater amount of excess reactivity is added to the system, for example, if all of the available reactivity (about 0.5%) is suddenly added, the temperature of the core will rise to a value less than 240° C. In this case water will be suddenly ejected from the core in addition to the counterbalancing of the reactivity in the system. Since the fuel elements are designed to withstand a temperature of about 300° C., they will be unaffected by the sudden ejection of water from the core. Tests indicate that ejection of water from the core will not lead to damage of the reactor so long as the maximum fuel temperature does not exceed 300° C.

A further increase in the high prompt negative temperature coefficient of reactivity may be obtained in the present reactor by adding a predetermined amount of suitable "poison" to the system. The "poison" should be such that the relative absorption of neutrons by the high neutron capturing material relative to the absorption of neutrons by the fissionable material increases with the temperature of the fuel. The addition of "poisons" to the reactor results in the absorption of neutrons. This neutron loss, however, is comparable to or less than the neutron loss resulting from the presence of uranium 238 or natural leakage sufficient to produce the same temperature coefficient for the reactor. The material used as a "poison" can vary widely and may be either a material which has a constant or increasing absorption cross section up to a temperature over about 300° C., such as samarium or cadmium, or a "black poison" such as a suitable thickness of boral (a boron carbide-aluminum mixture) which is essentially opaque to neutrons. The "poison" may be added either directly to the fuel element or may be located externally of the fuel element, such as at the inner face of the reflector, as desired.

For example, in a reactor such as has just been described, "black poison" is conveniently added by adding compressed boral in the form of discs .75 in. in diameter x .05 in. thickness at each end of the central body portion of each fuel element. This will give a total capture probability in the "poison" of around 10% and give an added contribution to the negative temperature coefficient of reactivity of about $1.0 \times 10^{-4}$/° C. or greater. The addition of this amount of "black poison" will require an increase in critical mass of about 30% or the addition of about eighteen fuel elements to the core.

It is seen from the foregoing that a practical reactor for the efficient production of radioactive isotopes of various half-lives can be constructed, in accordance with the present invention, in a relatively simple and inexpensive manner utilizing the earth and water as a shielding means and incorporating improved irradiation facilities, cooling system and control means. The reactor is operable by a small number of relatively unskilled operators, so that operating costs are minimized. Accordingly, the reactor of the present invention is suitable for use by industry and in other similar applications as set forth in the foregoing.

The various features of the invention which are believed to be new are set forth in the following claims.

We claim:

1. In a neutronic reactor, a reactive core, a reflector extending about the core, a circularly extending recess in said reflector, a flat ring supported adjacent the mouth of said recess, means for rotating the ring, said ring including a plurality of horizontally spaced cups connected to and extending downwardly from said ring into said recess for supporting a plurality of specimens to be irradiated, means for removing a specimen from a cup at a predetermined position in said recess, and means for locating any cup at said predetermined position.

2. In a neutronic reactor, a reactive core, a reflector extending about the core, a circularly extending recess in said reflector, a flat ring supported horizontally adjacent the mouth of said recess, drive means extending from the exterior of said reactor to said recess for rotating said ring, a plurality of horizontally spaced cups connected to and extending downwardly from said ring into said recess for supporting a plurality of specimens to be irradiated, means for removing a specimen from a cup at a predetermined position in said recess, means for positioning said ring so as to locate any selected cup at said predetermined position, said positioning means including an indicator which is connected to said drive means for indicating the position of the cups relative to said predetermined position, and a locking means engageable only when a cup is at said predetermined position for preventing the rotation of said ring.

3. In a neutronic reactor, a reactive core, a reflector extending about the core, a circularly extending recess in said reflector, a flat ring supported horizontally adjacent the mouth of said recess, drive means extending from the exterior of said reactor to said recess for rotating said ring, a plurality of horizontally spaced cups connected to and extending downwardly from said ring into said recess for supporting a plurality of specimens to be irradiated, means for removing a specimen from a cup at a predetermined position in said recess, means for positioning said ring so as to locate any selected cup at said predetermined position, said positioning means including an indicator which is connected to said drive means for indicating the position of the cups in said ring relative to said predetermined position, and a positioning rod extending from the exterior of said reactor to the interior of said recess and engageable with a suitable hole in said ring whenever a cup is at said predetermined position, a water-tight housing surrounding said ring and extending cups, a first pipe extending upwardly from a first opening in said housing to the exterior of said reactor, said first pipe enclosing those portions of said drive means and said positioning rod which are between said housing and the upper end of the reactor, and a delivery and removal pipe extending upwardly from a second opening in said housing to the upper end of the reactor, said second opening being in alignment with said predetermined position in said recess.

4. In a neutronic reactor, a reactive core, a reflector extending about the core, a circularly extending recess in said reflector, a ring supported adjacent the mouth of said recess, means for rotating the ring, a plurality of spaced cups connected to said ring and extending into said recess for supporting a plurality of specimens to be irradiated, means for removing a specimen from a cup at a predetermined position in said recess, and means for locating any cup at said predetermined position.

5. In a neutronic reactor, a reactive core, a reflector extending about the core, a circularly extending recess in said reflector, a ring supported adjacent the mouth of said recess, a plurality of spaced cups connected to and extending from said ring into said recess for supporting a plurality of specimens to be irradiated, means for removing a specimen from a cup at a predetermined position in said recess, drive means extending from the exterior of said reactor to said recess for rotating said ring to locate any selected cup at said predetermined position, means connected to said drive means for indicating the position of the cups relative to said predetermined position, and locking means engageable only when a cup is at said predetermined position for preventing rotation of said ring.

6. In a neutronic reactor, a reactive core, a reflector extending about the core, a circularly extending recess in said reflector, a ring supported adjacent the mouth of said recess, a plurality of spaced cups connected to and extending from said ring into said recess for supporting a plurality of specimens to be irradiated, means for removing a specimen from a cup at a predetermined position in said recess, drive means extending from the exterior of said reactor to said recess for rotating said ring to locate any selected cup at said predetermined position, means connected to said drive means for indicating the position of the cups relative to said predetermined position, locking means engageable with said ring when a cup is at said predetermined position for preventing rotation of said ring, and means for preventing engagement of said locking means and said ring.

7. In a neutronic reactor, a reactive core, a reflector extending about the core, a circularly extending recess in said reflector, a ring supported adjacent the mouth of said recess, a plurality of spaced cups connected to and extending from said ring into said recess for supporting a plurality of specimens to be irradiated, said ring including a series of holes which are individually arranged in a pattern corresponding to the spacing of said cups, means for removing a specimen from a cup at a predetermined position in said recess, drive means extending from the exterior of said reactor to said recess for rotating said ring to locate any selected cup at said predetermined position, means connected to said drive means for indicating the position of the cups relative to said predetermined position, and locking means for preventing rotation of said ring, said locking means being engageable with any selected one of said holes when the corresponding cup is at said predetermined position.

8. In a neutronic reactor, a vertically extending reactor tank disposed within a pit in the ground to provide effective shielding against radiation produced during operation of the reactor, a quantity of water which serves both as a moderator and as a coolant occupying a major portion of the volume of said tank, a reactive core centrally disposed in the lower end of said tank above the bottom thereof, a reflector enclosed within a water-tight housing extending about said reactive core, the diameter of said reflector housing being less than that of said tank so as to provide an annulus between said reflector and said tank, a circularly extending recess in said reflector, a flat ring supported horizontally adjacent the mouth of said recess, a plurality of horizontally spaced cups connected to and extending downwardly from said ring into said recess for supporting a plurality of specimens to be irradiated, said ring including a series of holes which are individually arranged in a pattern corresponding to the spacing of said cups, means for removing a specimen from a cup at a predetermined position in said recess, drive means extending from the exterior of said reactor to said recess for rotating said ring to locate any selected cup at said predetermined position, means connected to said drive means for indicating the position of the cups in said ring relative to said predetermined position, and a positioning rod for preventing rotation of said ring, said rod extending from the exterior of said reactor to said ring for engagement with any selected one of said holes in said ring when the corresponding cup is at said predetermined position, stationary water-tight housing surrounding said ring and extending cups, a first pipe extending upwardly from a first opening in said housing to the exterior of said reactor, said first pipe enclosing those portions of said drive means and said positioning rod which are between said ring and the upper end of the reactor, and a delivery and removal pipe extending upwardly from a second opening in said housing to the upper end of the reactor, said second opening permitting passage therethrough of said specimen removing means and being in alignment with said predetermined position in said recess.

9. In a neutronic reactor, a reactive core, a reflector extending about the core, a recess in said reflector, a movable rack adapted to support spaced cups mounted adjacent the mouth of said recess, means for moving said rack along said recess, a plurality of spaced cups connected to said rack and extending into said recess for supporting a plurality of specimens to be irradiated, means for removing a specimen from a cup at a predetermined position in said recess, and indexing means for locating any cup at said predetermined position.

10. In a neutronic reactor, a reactive core, a reflector extending about the core, a recess in said reflector, a movable rack adapted to support spaced cups mounted adjacent the mouth of said recess, a plurality of spaced cups connected to and extending from said rack into said recess for supporting a plurality of specimens to be irradiated, means for removing a specimen from a cup at a predetermined position in said recess, drive means extending from the exterior of said reactor to said recess for moving said rack along said recess to locate any selected cup at said predetermined position, indexing means connected to said drive means for indicating the position of the cups relative to said predetermined position, and locking means engageable only when a cup is at said predetermined position for preventing movement of said rack.

11. In a neutronic reactor, a reactive core, a reflector extending about the core, a recess in said reflector, a movable rack adapted to support spaced cups mounted adjacent the mouth of said recess, a plurality of spaced cups connected to and extending from said rack into said recess for supporting a plurality of specimens to be irradiated, means for removing a specimen from a cup at a predetermined position in said recess, drive means extending from the exterior of said reactor to said recess for moving said rack along said recess to locate any selected cup at said predetermined position, indexing means connected to said drive means for indicating the position of the cups relative to said predetermined position, locking means engageable with said rack when a cup is at said predetermined position for preventing movement of said rack and means for preventing engagement of said locking means and said rack.

References Cited in the file of this patent
UNITED STATES PATENTS

| | | |
|---|---|---|
| 2,143,189 | Ewing | Jan. 10, 1939 |
| 2,159,623 | Schmidt | May 23, 1939 |
| 2,595,632 | Bivings et al. | May 6, 1952 |
| 2,714,577 | Fermi et al. | Aug. 5, 1955 |
| 2,736,696 | Wigner et al. | Feb. 28, 1956 |
| 2,761,094 | Frampton | Aug. 28, 1956 |
| 2,874,108 | Ohlinger et al. | Feb. 17, 1959 |

OTHER REFERENCES

AECD 3435, April 1952, 59 pages.
TID 10102, Dec. 20, 1954, 53 pages.

UNITED STATES PATENT OFFICE
CERTIFICATE OF CORRECTION

Patent No. 3,072,549                         January 8, 1963

Stanley L. Koutz et al.

It is hereby certified that error appears in the above numbered patent requiring correction and that the said Letters Patent should read as corrected below.

Column 21, line 32, for "circuit" read -- circular --; column 22, line 5, for "and", second occurrence, read -- end --; column 27, lines 37 and 38, before "stationary" insert -- a --.

Signed and sealed this 17th day of September 1963.

(SEAL)
Attest:

ERNEST W. SWIDER
Attesting Officer

DAVID L. LADD
Commissioner of Patents